US012586995B2

(12) United States Patent
Higashi et al.

(10) Patent No.: US 12,586,995 B2
(45) Date of Patent: Mar. 24, 2026

(54) ELECTRICAL APPARATUS AND PLUG

(71) Applicant: YAMAHA HATSUDOKI KABUSHIKI KAISHA, Iwata (JP)

(72) Inventors: Tomoyuki Higashi, Shizuoka (JP);
Mitsuharu Hasumi, Shizuoka (JP);
Gakuto Hoshida, Shizuoka (JP);
Masatsugu Uda, Shizuoka (JP);
Takahiro Itagaki, Shizuoka (JP);
Norihiro Morozumi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 480 days.

(21) Appl. No.: 17/961,899

(22) Filed: Oct. 7, 2022

(65) Prior Publication Data

US 2023/0111695 A1 Apr. 13, 2023

(30) Foreign Application Priority Data

Oct. 8, 2021 (JP) ................................ 2021-166445

(51) Int. Cl.
*H02G 3/08* (2006.01)
*H01R 13/533* (2006.01)
(52) U.S. Cl.
CPC ........... *H02G 3/088* (2013.01); *H01R 13/533* (2013.01)
(58) Field of Classification Search
CPC . H02G 3/088; H02G 3/22; H02G 3/24; H01R 13/533; B62J 1/165; B62J 11/19; B62J 50/22; B62K 23/02; H05K 5/069; H05K 5/064; H05K 5/062; B62M 6/45; Y02A 30/14

USPC .......................................................... 174/50
See application file for complete search history.

(56) References Cited

U.S. PATENT DOCUMENTS

| | | | | |
|---|---|---|---|---|
| 4,952,938 A * | 8/1990 | Kirkland | ............... | G01V 15/00 |
| | | | | 367/12 |
| 5,573,429 A * | 11/1996 | Miyazaki | ............. | H01R 13/562 |
| | | | | 439/587 |
| 5,811,728 A | 9/1998 | Maeda | | |
| 2002/0100599 A1 * | 8/2002 | Rittmann | ................. | H05K 5/06 |
| | | | | 174/50.56 |
| 2004/0106316 A1 * | 6/2004 | Noguchi | ............ | H01R 13/5205 |
| | | | | 439/272 |

FOREIGN PATENT DOCUMENTS

| | | | |
|---|---|---|---|
| JP | 1-66713 U | 4/1989 | |
| JP | 07-143643 A | 6/1995 | |

(Continued)

*Primary Examiner* — Timothy J Thompson
*Assistant Examiner* — Sidi M Maiga
(74) *Attorney, Agent, or Firm* — Keating & Bennett, LLP

(57) ABSTRACT

An electrical apparatus includes a housing including an opening, an electronic component in the housing, electrical wires connected to the electronic component and extending out of the housing through the opening, a plug extending in a first direction and inserted in the opening with the electrical wires passing through the opening, and a waterproofing material in the opening. The plug includes a first outer peripheral surface matching an inner wall surface of the opening, and a second outer peripheral surface opposite and spaced apart from the inner wall surface of the opening. The electrical wires are between the second outer peripheral surface and the inner wall surface of the opening.

15 Claims, 20 Drawing Sheets

(56) References Cited

FOREIGN PATENT DOCUMENTS

| JP | 07-307182 | A | 11/1995 |
| JP | 2767731 | B2 | 6/1998 |
| JP | 2014-007004 | A | 1/2014 |
| JP | 2016-001978 | A | 1/2016 |

* cited by examiner

UP

RIGHT ←→ LEFT

DOWN

FRONT

LEFT ◄———► RIGHT

REAR

ELECTRICAL APPARATUS AND PLUG

BACKGROUND OF THE INVENTION

1. Field of the Invention

The present invention relates to electrical apparatuses that are required to be waterproof. The present invention also relates to plugs that are used in such electrical apparatuses.

2. Description of the Related Art

Electrical apparatuses that are used in wet environments such as outdoor environments are generally required to be waterproof.

The housing of an electrical apparatus may be provided with an opening through which electrical wires connected to parts in the housing are extended out of the housing. Water ingress to the inside of the housing through such an opening needs to be prevented.

Japanese Utility Laid-Open Publication No. H01-066713 discloses a cylindrical grommet that is provided in an opening of a housing and through which electrical wires are passed. The inside of the cylindrical grommet is filled with a liquid waterproofing material with electrical wires passed through the cylindrical grommet, and then the liquid waterproofing material is cured to attain waterproofness.

Before being cured, the waterproofing material is liquid, which may cause a problem that the waterproofing material is likely to flow from the inside of the grommet to other parts that do not require the waterproofing material.

SUMMARY OF THE INVENTION

In order to improve waterproofness, the filling waterproofing material needs to be reduced or prevented from flowing into other parts that do not require the waterproofing material.

An electrical apparatus according to a preferred embodiment of the present invention includes a housing including an opening, an electronic component in the housing, a plurality of electrical wires connected to the electronic component and extending out of the housing through the opening, a plug extending in a first direction and inserted in the opening with the plurality of electrical wires passing through the opening, and a waterproofing material in the opening. The plug includes a first outer peripheral surface matching an inner wall surface of the opening in the opening, and a second outer peripheral surface opposite and spaced apart from the inner wall surface of the opening. The plurality of electrical wires are accommodated between the second outer peripheral surface and the inner wall surface of the opening.

When the electrical wires are passed through the opening of the housing of the electrical apparatus, a void that is not occupied by any electrical wire is left in the opening. According to a preferred embodiment of the present invention, the plug is inserted together with the electrical wires in the opening, and therefore, the void is reduced or prevented. Since the second outer peripheral surface of the plug is spaced apart from the inner wall surface of the opening, the electrical wires are accommodated between the second outer peripheral surface and the inner wall surface of the opening, and the plug is inserted together with the electrical wires in the opening. Since the void in the opening is prevented, a waterproofing material is reduced or prevented from flowing into a portion that does not require the waterproofing material when the void is filled with the waterproofing material, resulting in an improved waterproofness.

In a configuration in which a protection cover is provided between the opening and the bundle of electrical wires, a void is left in a portion of the space surrounded by the protection cover that is not occupied by any electrical wire. The void is reduced or prevented using the plug, resulting in an improved waterproofness as in the foregoing preferred embodiment.

Since the first outer peripheral surface of the plug matches the inner wall surface of the opening, the position of the plug is stabilized. The stabilization of the position of the plug stabilizes the positions of the electrical wires inserted between the second outer peripheral surface and the inner wall surface of the opening, which in turn reduces or prevents movement of the electrical wires. By reducing or preventing movement of the electrical wires, a void is reduced or prevented from being produced between the electrical wires and the waterproofing material, resulting in an improved waterproofness.

In a preferred embodiment of the present invention, the plug may further include two third outer peripheral surfaces linking the first outer peripheral surface and the second outer peripheral surface together.

A portion of the electrical wires inserted between the second outer peripheral surface and the inner wall surface of the opening are in contact with and supported by the third outer peripheral surfaces. Therefore, the positions of the electrical wires are further stabilized.

In a preferred embodiment of the present invention, the plug has a center axis extending parallel to the first direction, and the first outer peripheral surface may have, in a cross-section thereof perpendicular to the first direction, a first arc shape extending around the center axis.

When the plug and the electrical wires are bound by a binder such as a cable tie, the binder easily extends along the first outer peripheral surface, resulting in a stable binding.

In a preferred embodiment of the present invention, in the cross-section, the second outer peripheral surface may have a second arc shape extending around the center axis. A distance between the center axis and the second outer peripheral surface may be shorter than a distance between the center axis and the first outer peripheral surface. A center point along the second arc shape of the second outer peripheral surface may be located on the opposite side of the center axis from a center point along the first arc shape of the first outer peripheral surface.

As a plurality of electrical wires are arranged along the second outer peripheral surface, which has a relatively small arc shape compared to the first outer peripheral surface, the positions of the electrical wires are stabilized, which in turn reduces or prevents movement of the electrical wires. By reducing or preventing movement of the electrical wires, a void is reduced or prevented from being produced between the electrical wires and the waterproofing material, resulting in an improved waterproofness. In addition, as the plurality of electrical wires are arranged along the second outer peripheral surface, and therefore, a positional relationship between the plug and the electrical wires is stabilized, the plug and the plurality of electrical wires are easily bound together.

In a preferred embodiment of the present invention, in the cross-section, the first outer peripheral surface may have a circular arc shape.

When the plug and the electrical wires are bound by a binder such as a cable tie, the binder easily extends along the first outer peripheral surface, resulting in a stable binding.

In a preferred embodiment of the present invention, in the cross-section, the second outer peripheral surface may have a circular arc shape.

The plurality of electrical wires arranged along the second outer peripheral surface, and the plug, may be bound by a binder that is curved along the first outer peripheral surface. Since the plurality of electrical wires are arranged along the second outer peripheral surface, which has a relatively small circular arc shape compared to the first outer peripheral surface, the plug and the plurality of electrical wires are stably inserted in a ring defined by the binder.

In a preferred embodiment of the present invention, the plug is shaped such that in the cross-section, a sector whose central angle has a vertex at the center axis and whose radius has a first length, and a circle whose center is located at the center axis and whose radius has a second length which is shorter than first length, overlap each other.

When the plug and the electrical wires are bound by a binder such as a cable tie, the binder easily extends along the first outer peripheral surface, resulting in a stable binding.

Since the plurality of electrical wires are arranged along the outer periphery of the relatively small circle compared to the sector, the plug and the plurality of electrical wires are stably inserted in a ring defined by the binder.

In a preferred embodiment of the present invention, in the cross-section, a space having an annular sector shape may be provided between the plug and the opening, and the electrical wires may be accommodated in the annular sector space.

As the electrical wires are accommodated in the annular sector space between the plug and the opening, the plug is located together with the electrical wires in the opening.

In a preferred embodiment of the present invention, the plug may further include a flange that extends from a first end portion in the first direction of the first outer peripheral surface in a direction intersecting with the first direction.

As the flange of the plug is hooked onto the entrance of the opening, the plug is prevented from falling out of the opening.

In a preferred embodiment of the present invention, the electrical apparatus may further include a binder that binds the plurality of electrical wires and the plug. The binder may be located between the opening and the flange.

As a result, the binder is prevented from being displaced.

In a preferred embodiment of the present invention, a second end portion of the first outer peripheral surface on the opposite side from the first end portion in the first direction may have a tapered shape.

As a result, the plug is easily inserted in the opening with the plug and the bound electrical wires.

In a preferred embodiment of the present invention, the electrical apparatus may further include a protection cover provided between the opening and the combination of the plurality of electrical wires and the plug, and surrounding the plurality of electrical wires and the plug.

As the plug is located in the space surrounded by the protection cover, a void is reduced or prevented in the space, and therefore, the waterproofing material that fills the void is reduced or prevented from flowing into a portion that does not require the waterproofing material.

In a preferred embodiment of the present invention, the plug may penetrate through the opening, and a portion of the plug may extend out of the housing.

As a result, the positions of the electrical wires are stabilized in the vicinity of an external surface of the housing.

In a preferred embodiment of the present invention, the electrical apparatus may include an operation board provided on a handlebar of the electric power assisted bicycle, and operable to receive an operation performed by a user of the electric power assisted bicycle.

As a result, the operation board of the electric power assisted bicycle has high waterproofness.

A plug according to a preferred embodiment of the present invention, which is inserted together with a plurality of electrical wires in an opening of a housing of an electrical apparatus, includes a solid body extending in a first direction. The solid body includes a center axis extending parallel or substantially parallel to the first direction, a first outer peripheral surface having, in a cross-section thereof perpendicular to the first direction, a first arc shape extending around the center axis, a second outer peripheral surface having, in a cross-section thereof perpendicular to the first direction, a second arc shape extending around the center axis, and a third outer peripheral surface linking the first outer peripheral surface and the second outer peripheral surface together. A distance between the center axis and the second outer peripheral surface is shorter than a distance between the center axis and the first outer peripheral surface. In the cross-section, a center point along the second arc shape of the second outer peripheral is located on the opposite side of the center axis from a center point along the first arc shape of the first outer peripheral surface.

When the electrical wires are passed through the opening of the housing of the electrical apparatus, a void that is not occupied by any electrical wire is left in the opening.

The void is reduced or prevented by the plug being inserted together with the electrical wires in the opening. The prevention of the void reduces or prevents a waterproofing material from flowing into a portion that does not require the waterproofing material when the void is filled with the waterproofing material, resulting in an improved waterproofness.

In a configuration in which a protection cover is provided between the opening and the bundle of electrical wires, a void is left in a portion of the space surrounded by the protection cover that is not occupied by any electrical wire. The void is reduced or prevented using the plug, resulting in an improved waterproofness as in the foregoing preferred embodiments.

A plurality of electrical wires are able to be arranged along the second outer peripheral surface, which has a relatively small arc shape compared to the first outer peripheral surface, and therefore, the positions of the electrical wires are stabilized, which in turn reduces or prevents movement of the electrical wires. By reducing or preventing movement of the electrical wires, a void is reduced or prevented from being produced between the electrical wires and the waterproofing material, resulting in an improved waterproofness. In addition, as the plurality of electrical wires are arranged along the second outer peripheral surface, and therefore, a positional relationship between the plug and the electrical wires is stabilized, the plug and the electrical wires are easily bound together.

A portion of the plurality of electrical wires arranged along the second outer peripheral surface are in contact with and supported by the third outer peripheral surfaces, and therefore, the positions of the electrical wires are further stabilized.

When the electrical wires are passed through the opening of the housing of the electrical apparatus, a void is left in a portion of the opening that is not occupied by any electrical wire. According to a preferred embodiment of the present invention, the plug is inserted together with the electrical wires in the opening, and therefore, the void is reduced or prevented. Since the second outer peripheral surface of the plug is spaced apart from the inner wall surface of the opening, the electrical wires are accommodated between the second outer peripheral surface and the inner wall surface of the opening, and the plug is inserted together with the electrical wires in the opening. Since the void in the opening is prevented, a waterproofing material is reduced or prevented from flowing into a portion that does not require the waterproofing material when the void is filled with the waterproofing material, resulting in an improved waterproofness.

In a configuration in which a protection cover is provided between the opening and the bundle of electrical wires, a void is left in a portion of the space surrounded by the protection cover that is not occupied by any electrical wire. The void is reduced or prevented using the plug, resulting in an improved waterproofness as in the foregoing preferred embodiments.

As the first outer peripheral surface of the plug matches the inner wall surface of the opening, the position of the plug is stabilized. The stabilization of the position of the plug stabilizes the positions of the electrical wires inserted between the second outer peripheral surface and the inner wall surface of the opening, which in turn reduces or prevents movement of the electrical wires. By reducing or preventing movement of the electrical wires, a void is reduced or prevented from being produced between the electrical wires and the waterproofing material, resulting in an improved waterproofness.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
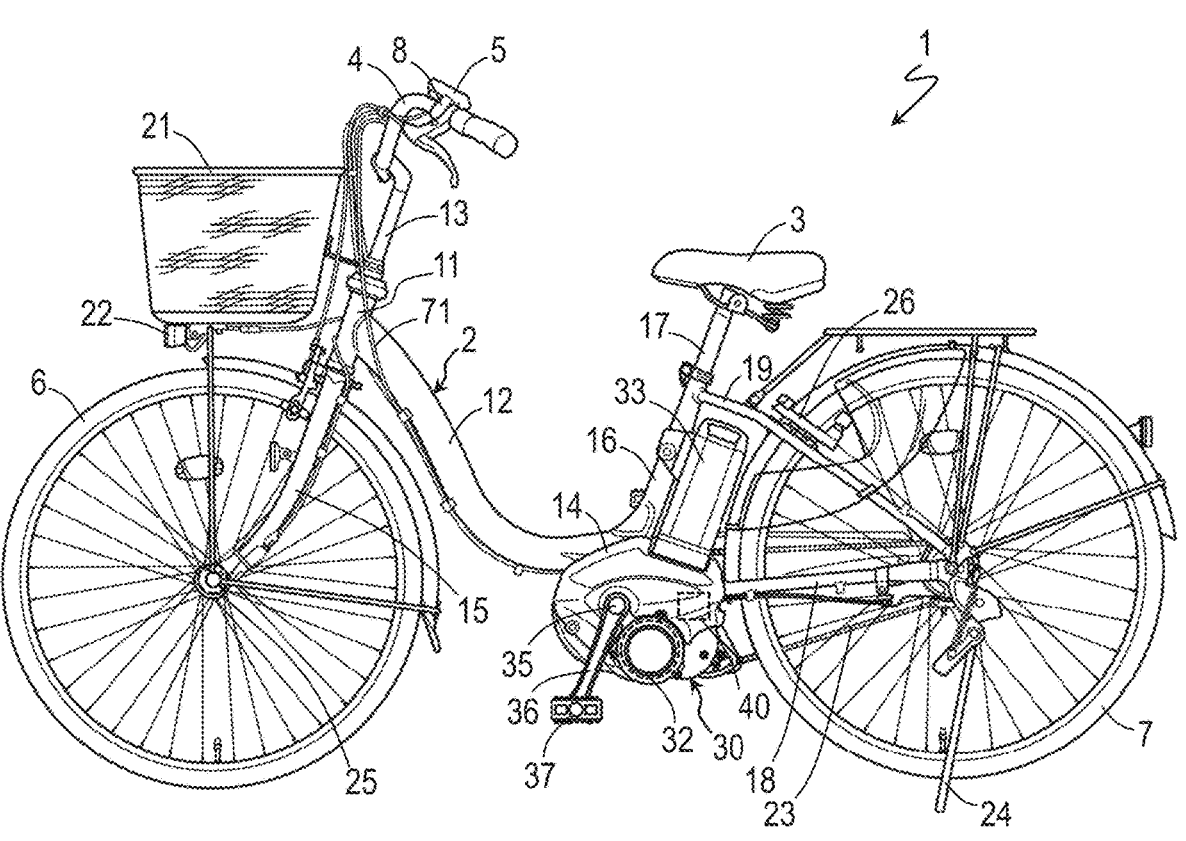
FIG. 1 is a side view illustrating an electric power assisted bicycle 1 according to a preferred embodiment of the present invention.
Figure 1:
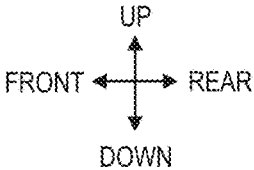

Electrical apparatuses and plugs according to preferred embodiments of the present invention will be described below with reference to the accompanying drawings. In the description of the preferred embodiments, like elements or features are indicated by like reference characters and will not be redundantly described. The preferred embodiments below are merely for illustrative purposes, and the present invention is not limited to the preferred embodiments below.

Among the electrical apparatuses that are required to be waterproof is an operation board that is provided on the handlebar of an electric power assisted bicycle. The electric power assisted bicycle is an example of electric power assisted vehicles. The electric power assisted bicycle is provided with an electric motor that generates a drive force according to the user's pedaling force. The operation board provided on the handlebar of the electric power assisted bicycle receives the user's commands. By operating switches of the operation board, the user is able to turn on and off the power supply of the electric power assisted bicycle, and adjust the magnitude of assistance power generated by the electric motor. Since the electric power assisted bicycle is used outdoors, the operation board is required to be waterproof.

An example in which an electrical apparatus according to the present preferred embodiment is an operation board for an electric power assisted bicycle will be described below. However, the electrical apparatus is not limited to an operation board for an electric power assisted bicycle. The present invention is applicable to electrical apparatuses required to be waterproof. For example, the electrical apparatus of the present preferred embodiment may be an illumination device, surveillance camera, communication device, power supply device, or the like. The electrical apparatus of the present preferred embodiment may be one that is provided on other vehicles besides electric power assisted vehicles.

Firstly, an electric power assisted bicycle on which an operation board is provided will be described.

FIG. 1 is a side view illustrating an electric power assisted bicycle 1 according to a preferred embodiment of the present invention. The front and rear, up and down, and left and right of the electric power assisted bicycle 1 in FIG. 1 each have a meaning that is defined in relation to a user who is sitting on a saddle 3 of the electric power assisted bicycle 1 and facing a handlebar 4.

The electric power assisted bicycle 1 includes a body frame 2 that extends in a longitudinal direction (forward and rearward). The body frame 2 includes a head pipe 11, a down tube 12, a bracket 14, a chain stay 18, a seat tube 16, and a seat stay 19. The head pipe 11 is disposed at a front end of the body frame 2. A handlebar stem 13 is rotatably inserted in the head pipe 11. A handlebar 4 is fixed at an upper end portion of the handlebar stem 13. A front fork 15 is fixed at a lower end portion of the handlebar stem 13. A lower end portion of the front fork 15 rotatably supports a front wheel 6, which is a steered wheel. A speed sensor 25 that detects the rotation of the front wheel 6 is provided at a lower end portion of the front fork 15. A front-mounted basket 21 is provided in front of the head pipe 11. A headlight 22 is provided below the front-mounted basket 21.

The down tube 12 extends diagonally downward and rearward from the head pipe 11. The seat tube 16 extends upward from a rear end portion of the down tube 12. The chain stay 18 extends rearward from a lower end portion of the seat tube 16. The bracket 14 connects a rear end portion of the down tube 12, a lower end portion of the seat tube 16, and a front end portion of the chain stay 18 together. The seat tube 16 is inserted in a seat post 17. A saddle 3 that a user sits on is provided at an upper end portion of the seat post 17.

A rear portion of the chain stay 18 rotatably supports a rear wheel 7, which is a drive wheel. A kickstand 24 that supports the bicycle in an upright position when the bicycle is parked is provided at a rear portion of the chain stay 18. The seat stay 19 extends diagonally downward and rearward from an upper portion of the seat tube 16. A lower end portion of the seat stay 19 is connected to a rear portion of the chain stay 18. A lock 26 that prevents the rear wheel 7 from rotating when the rear wheel 7 is locked is provided on the seat stay 19.

A drive unit 30 is provided on the bracket 14, which is located near a vehicle center portion of the body frame 2. The drive unit 30 includes an electric motor 32, a crank shaft 35, and a motor control unit (MCU) 40. A battery 33 that supplies power to the electric motor 32 and the like is mounted on the bracket 14. The battery 33 may be supported by the seat tube 16. The battery 33 may be removably attached to the electric power assisted bicycle 1.

The crank shaft 35 is supported by the drive unit 30, penetrating through the drive unit 30 in a transverse direction (leftward and rightward). A crank arm 36 is provided at either end portion of the crank shaft 35. A pedal 37 is rotatably provided at a tip end of each crank arm 36.

The MCU 40 controls the operation of the electric motor 32, and also controls the operation of each element of the electric power assisted bicycle 1. The MCU 40 includes a semiconductor integrated circuit such as a processor, and a motor drive circuit. The rotation of the crank shaft 35 generated by the user pushing the pedals 37 by their feet is transmitted to the rear wheel 7 through a chain 23. The MCU 40 controls the electric motor 32 so that the electric motor 32 generates a drive assistance power according to the rotation power of the crank shaft 35. The assistance power generated by the electric motor 32 is transmitted to the rear wheel 7 through the chain 23. A belt, shaft, or the like may be used instead of the chain 23.

The handlebar 4 is provided with an operation board 5. The operation board 5 is attached to the handlebar 4 by, for example, a clamp 8. The user is able to perform various operations such as setting the magnitude of the assistance power of the electric motor 32, by operating the operation board 5 with their finger. The operation board 5 and the MCU 40 may exchange signals through a wire 71.

The operation board 5 may be provided on the electric power assisted bicycle 1 in any manner. For example, the operation board 5 may be directly attached to the handlebar 4, or may be attached to a stay extending from the handlebar 4. The operation board 5 may be attached to the handlebar stem 13.

Next, the operation board 5 will be described in detail. The operation board 5 is an example of an electrical apparatus according to the present preferred embodiment.

Figure 2:
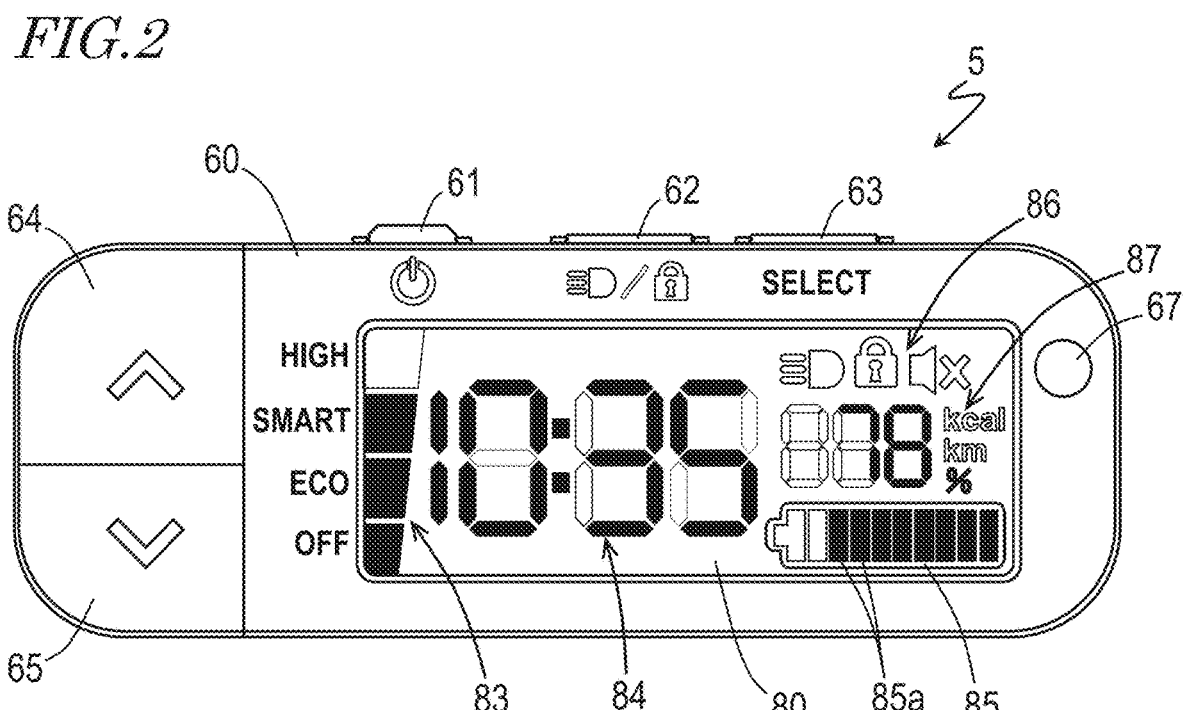
FIG. 2 is a top view of an operation board 5 according to a preferred embodiment of the present invention.
Figure 2:
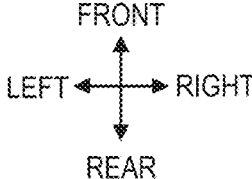
Figure 3:
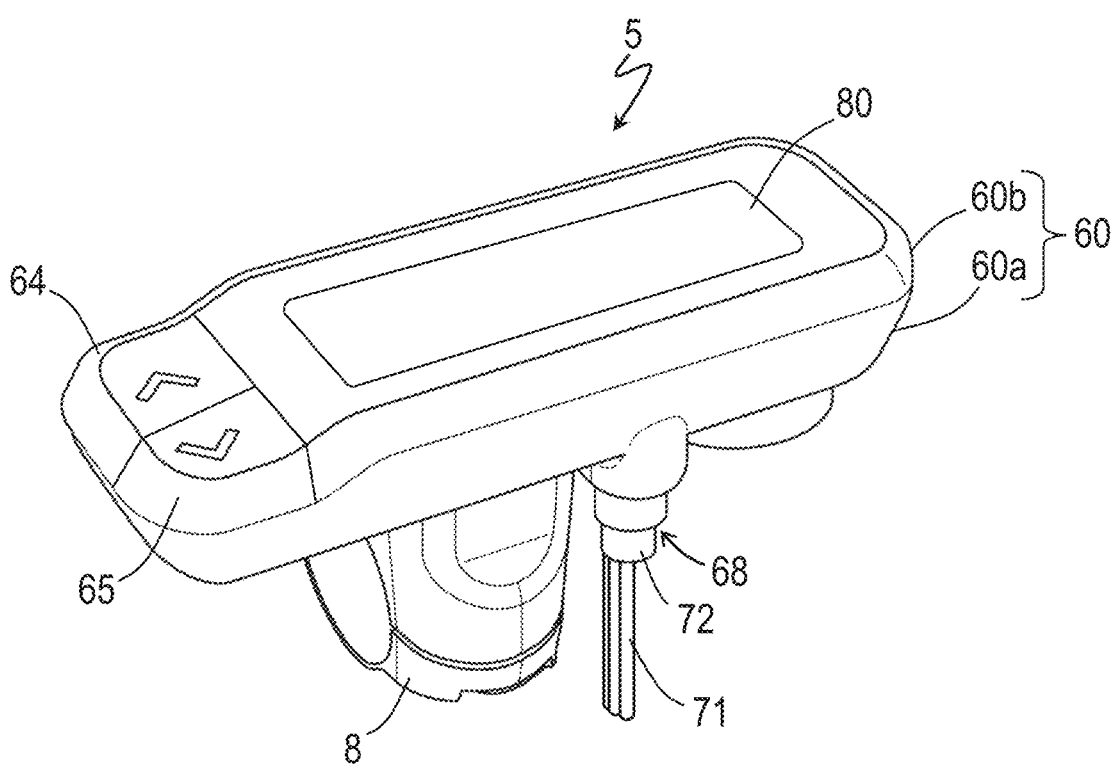
FIG. 3 is a perspective view of an operation board 5 according to a preferred embodiment of the present invention.
Figure 3:
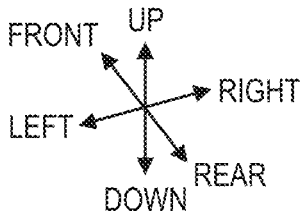

FIG. 2 is a top view of the operation board 5. FIG. 3 is a perspective view of the operation board 5. The operation board 5 includes a housing 60, a plurality of switches 61, 62, 63, 64, and 65 that receive the user's operation, an optical sensor 67, and a display panel 80. Specifically, the plurality of switches include a power supply switch 61, a headlight switch 62, a select switch 63, and assistance power setting switches 64 and 65. In a preferred embodiment of the present invention, these switches are push-button switches that are pressed and operated by the user's finger.

In a preferred embodiment of the present invention, a surface of the housing 60 of the operation board 5 on which the display panel 80 is provided is referred to as an upper surface, and the opposite surface from the upper surface is referred to as a lower surface. A longitudinal direction of the housing 60 as viewed from above is referred to as a left-right direction of the operation board 5. A direction that is perpendicular to the longitudinal direction and is parallel to the upper surface is referred to as a front-rear direction of the operation board 5. A direction that is perpendicular to the front-rear direction and the left-right direction is referred to as a top-bottom direction of the operation board 5.

The power supply switch 61 of the operation board 5 is used to turn on and off the power supply of the electric power assisted bicycle 1. When the power supply of the electric power assisted bicycle 1 is on, the drive unit 30 operates, and when the power supply is off, the drive unit 30 does not operate. When the power supply is off, and if the user presses down the power supply switch 61, the power supply is turned on. When the power supply is on, and if the user presses down the power supply switch 61, the power supply is turned off.

The display panel 80 displays various kinds of information according to the user's operation on the operation board 5. The display panel 80 is, for example, a liquid crystal panel. In a preferred embodiment of the present invention, the display panel 80 displays text, symbols, icons, and the like in a segment format. Alternatively, the display panel 80 displays text, symbols, icons, and the like in a dot-matrix format. Besides liquid crystal panels, the display panel 80 may be another display panel such as an organic light-emitting diode (OLED) panel or an electronic paper panel.

The operation board 5 has a clock function. Time information 84 is displayed in a central display area of the display panel 80. In the example illustrated in FIG. 2, time "10:35" is being displayed. In a preferred embodiment of the present invention, a processor included in the operation board 5 calculates time, and causes the display panel 80 to display the calculated time.

The select switch 63 is used to change display contents on the display panel 80. In a preferred embodiment of the present invention, selected information 87 selected by the user operating the select switch 63 is displayed in a central display area on the right side of the display panel 80. The selected information 87 may include, for example, the user's consumed calories, a remaining distance that power assistance can still be provided (remaining assistance distance), and the remaining charge of the battery 33. Each time the user presses down the select switch 63, the display of the display panel 80 is switched between the consumed calories, the remaining assistance distance, and the remaining battery charge, sequentially in the stated order. In the example of FIG. 2, "78%" is displayed as the remaining battery charge. The words "kcal" and "km" represent the units of the consumed calories and the remaining assistance distance, respectively.

In a preferred embodiment of the present invention, a distance between the select switch 63 and a position where the selected information 87 is displayed is shorter than the distances between the other switches and the position where the selected information 87 is displayed. The shorter distance between the select switch 63 and the position where the selected information 87 is displayed enables the user to easily recognize the function of the select switch 63, resulting in an intuitive operation.

The assistance power setting switches 64 and 65 are used to set the assistance power of the electric motor. In a preferred embodiment of the present invention, a plurality of assist modes are able to be set for the electric power assisted bicycle 1. The plurality of assist modes include, for example, a no-assist mode, eco mode, smart mode, and high mode, which are stated in ascending order of magnitude of assistance power to the user's pedaling force. In the no-assist mode, the electric motor 32 does not generate assistance power. When the user presses down the assistance power setting switch 64, the assist mode is changed from an assist mode in which a relatively low assistance power is provided to the user's pedaling force to another assist mode in which a relatively high assistance power is provided to the user's pedaling force. When the user presses down the assistance power setting switch 65, the assist mode is changed from an assist mode in which a relatively high assistance power is provided to the user's pedaling force to another assist mode in which a relatively low assistance power is provided to the user's pedaling force. In a preferred embodiment of the present invention, assist mode information 83 indicating an assist mode selected by the user is displayed in a display area on the left side of the display panel 80. In the example of FIG. 2, a display pattern including a plurality of segments is changed according to the selected assist mode to indicate the selected assist mode.

In the above example, there are four assist modes. The number of assist modes may be at most three or at least five. For example, there may be a mode in which an assistance power higher than that in the high mode is generated, or there may be a plurality of different eco modes.

The headlight switch 62 is used to turn on and off the headlight 22 (FIG. 1). When the user presses down the headlight switch 62 to turn the headlight 22 on, the headlight 22 emits light and thus illuminates a path ahead of the electric power assisted bicycle 1. In a preferred embodiment of the present invention, setting information 86 indicating settings of the electric power assisted bicycle 1 is displayed in an upper right display area of the display panel 80. When the headlight 22 is on, an icon representing the on-state of the headlight 22 is displayed as the setting information 86.

In a preferred embodiment of the present invention, by pressing and holding the headlight switch 62, the operation of the power supply switch 61 is locked. Pressing and holding a switch is the user's operation of continuing to press down the switch using their finger, and releasing the finger from the switch after a period of time longer than a reference time (e.g., 3 seconds) has passed. In the locked state in which the operation of the power supply switch 61 is locked, the power supply is not turned off even when the user presses down the power supply switch 61. During the locked state, an icon indicating that the operation of the power supply switch 61 is locked is displayed as the setting information 86. When the headlight switch 62 is pressed and held during the locked state, the locked state of the power supply switch 61 is removed.

The optical sensor 67 receives ambient light around the electric power assisted bicycle 1. The optical sensor 67 outputs a signal according to the received light. The headlight 22 is turned on and off according to the output signal of the optical sensor 67. This enables the headlight 22 to be automatically turned on and off, depending on the amount of ambient light around the electric power assisted bicycle 1. The optical sensor 67 is, for example, but not limited to, an illuminance sensor.

The display panel 80 also displays remaining battery charge information 85 indicating the remaining charge of the battery 33. In a preferred embodiment of the present invention, the display panel 80 displays an indicator to indicate the remaining charge of the battery 33 as the remaining battery charge information 85. In the example of FIG. 2, the indicator 85 includes a plurality of segments 85a. The number of segments 85a that are on (i.e., lit) is changed according to the remaining battery charge. The user is able to intuitively recognize the remaining charge of the battery 33 by seeing the indicator 85.

Figure 4:
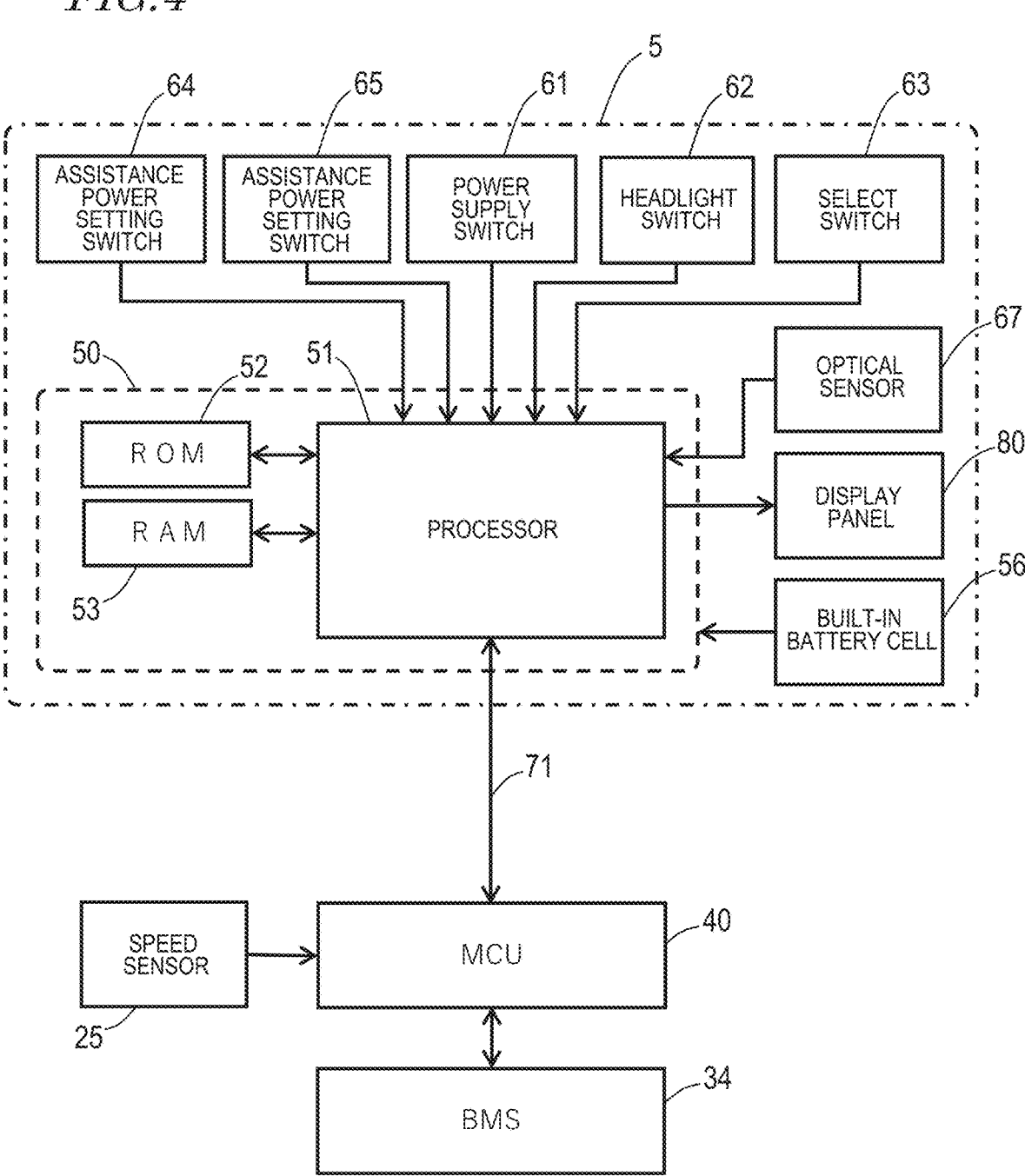
FIG. 4 is a hardware diagram of an operation board 5 according to a preferred embodiment of the present invention.

FIG. 4 is a hardware diagram of the operation board 5. The operation board 5 further includes a control device 50 and a built-in battery cell 56.

The control device 50 detects when a switch of the operation board 5 is pressed down, and controls an operation of the display panel 80. The control device 50 includes a processor 51, and storage media such as a read only memory (ROM) 52 and a random access memory (RAM) 53. The processor 51 may be, for example, a semiconductor integrated circuit. The processor 51 may be operated by power supplied from the built-in battery cell 56. The processor 51 may also be operated by power supplied from the battery 33 when the power supply of the electric power assisted bicycle 1 is on. The built-in battery cell 56 may be, for example, a primary cell, button cell, or the like. Alternatively, the built-in battery cell 56 may be a rechargeable secondary cell.

The ROM 52 stores a computer program (or firmware) that causes the processor 51 to execute processes. The processor 51 reads and loads the computer program from the ROM 52 to the RAM 53, and executes various processes. The RAM 53 and the ROM 52 may be integrated in the processor 51.

The processor 51 detects when a switch is pressed down. For example, when the user starts pressing down a switch, the processor 51 detects at least a predetermined voltage value and/or current value. When the user ends pressing down the switch, the processor 51 detects when the voltage value and/or current value detected so far becomes zero, for example. The processor 51 is able to detect, in parallel, when a plurality of switches are pressed down simultaneously.

The processor 51 changes the display contents of the display panel 80 according to a pressed switch of the operation board 5. The processor 51 transmits a signal corresponding to a pressed switch of the operation board 5 to the MCU 40. For example, the processor 51 transmits a signal indicating a selected assist mode to the MCU 40. The MCU 40, when receiving the signal, causes the electric motor 32 to generate an assistance power according to the selected assist mode.

A battery management system (BMS) 34 is mounted on the battery 33. The BMS 12 controls various operations such as charging/discharging of the battery 33, and monitors various states of the battery 33. The BMS 12 monitors the voltage, current, temperature, state of charge (SoC), and the like of the battery 33. The MCU 40 and the BMS 12 exchange necessary information with each other. The MCU 40 receives, from the BMS 12, battery information indicating the voltage, current, temperature, SoC, and the like of the battery 33.

The MCU 40 outputs SoC information indicating the SoC of the battery 33 to the operation board 5. The processor 51 controls the display of the display panel 80 related to the remaining battery charge calculated based on the SoC information.

As illustrated in FIG. 3, the housing 60 of the operation board 5 includes a first housing 60a and a second housing 60b. The first housing 60a and the second housing 60b, when attached together, define a space that accommodates the control device 50 and the like. The first housing 60a and the second housing 60b are fixed to each other by, for example, a portion of one housing being fitted into the other housing. The first housing 60a and the second housing 60b may be fixed to each other using, for example, a fastening device such as a bolt, or an adhesive.

The first housing 60a is provided with an opening 68 through which a plurality of electrical wires 71 are extended out of the housing 60. The electrical wires 71 are connected to electronic components disposed in the housing 60 such as the control device 50. For example, an electrical wire 71 may be connected to a substrate provided in the control device 50 through a connector. The control device 50 and the MCU 40 exchange signals through an electrical wire 71. The electrical wires 71 may be either separate individual wires or a multicore cable.

Figure 5:
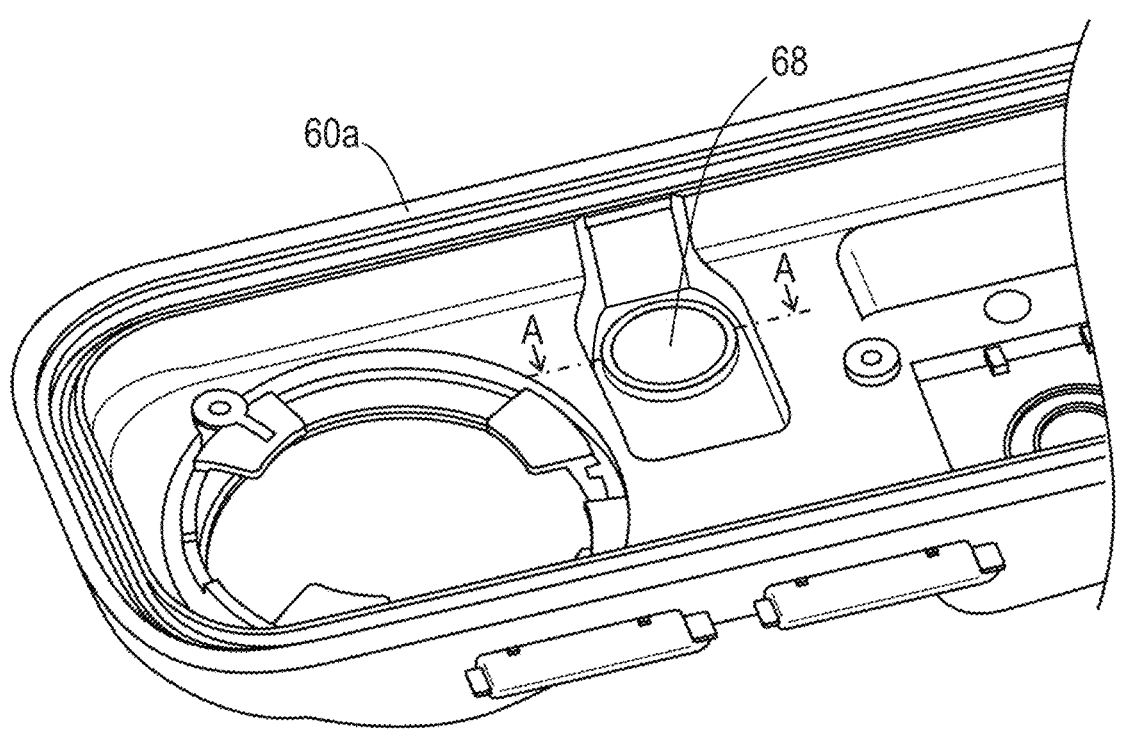
FIG. 5 is a perspective view illustrating a first housing 60a according to a preferred embodiment of the present invention.
Figure 5:
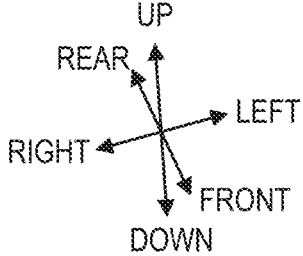
Figure 6:
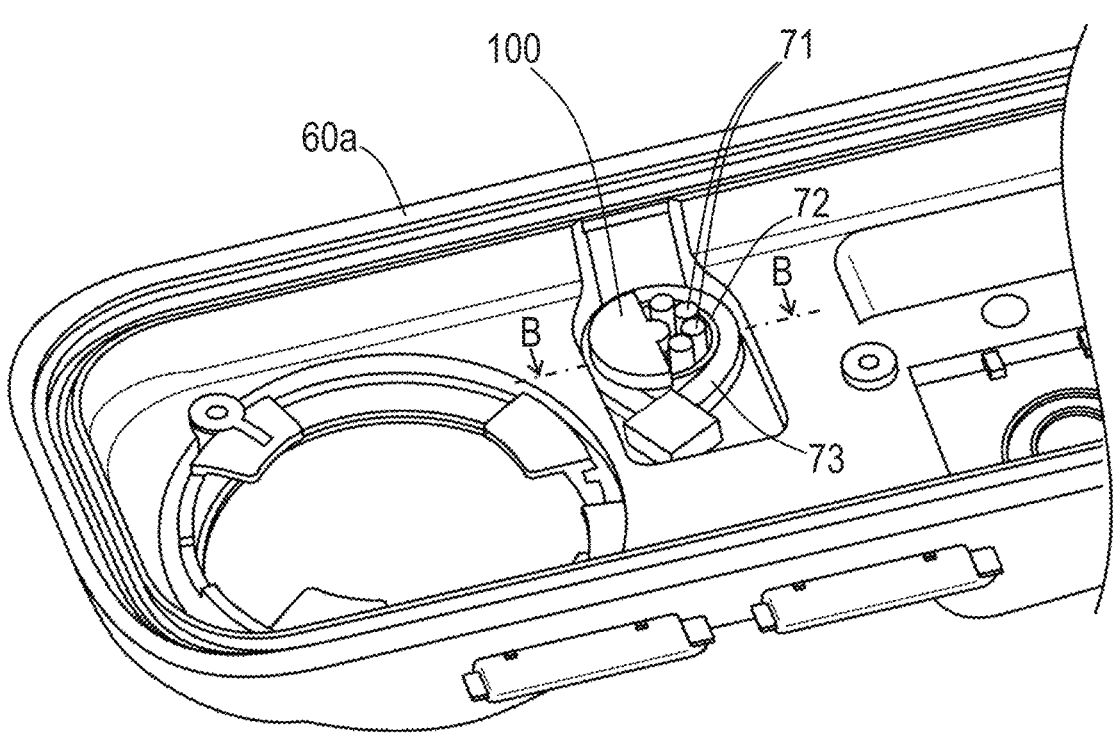
FIG. 6 is a perspective view illustrating a first housing 60a according to a preferred embodiment of the present invention and elements in an opening 68.
Figure 6:
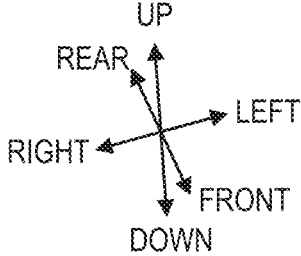
Figure 7:
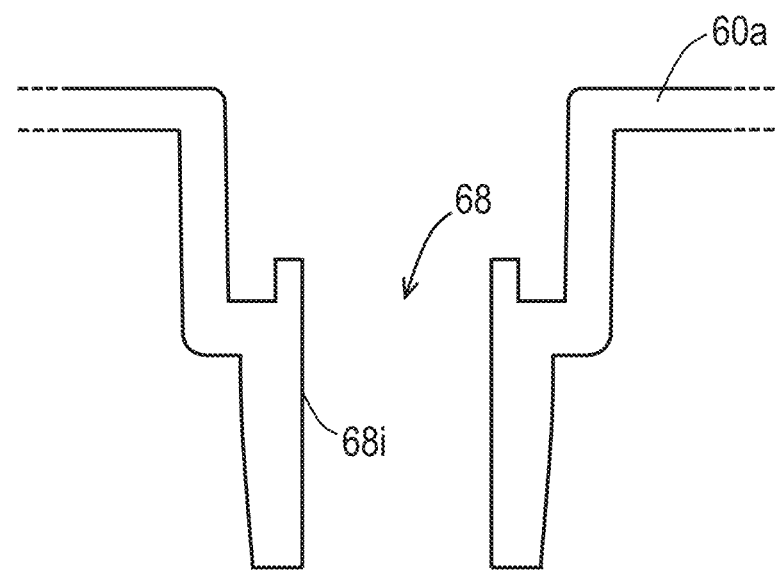
FIG. 7 is a cross-sectional view illustrating a first housing 60a according to a preferred embodiment of the present invention.
Figure 7:
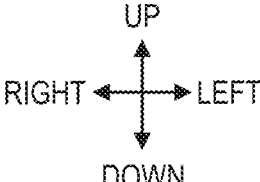
Figure 8:
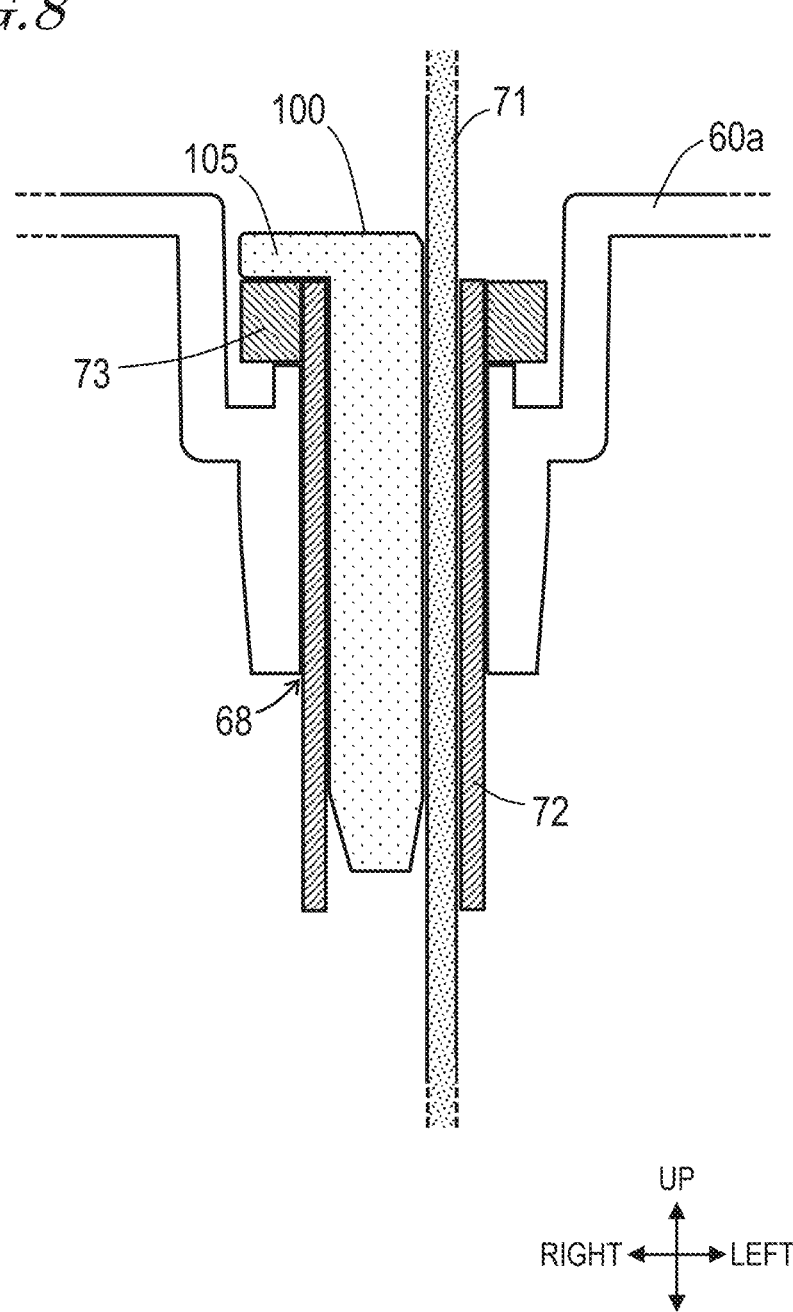
FIG. 8 is a cross-sectional view illustrating a first housing 60a according to a preferred embodiment of the present invention and elements in an opening 68.

FIGS. 5 and 6 are perspective views illustrating the first housing 60a. As illustrated in FIG. 5, the first housing 60a is provided with the opening 68. As illustrated in FIG. 6, a plurality of electrical wires 71 are passed through the opening 68. The number of electrical wires 71 passed through the opening 68 is not particularly limited. In the present preferred embodiment, a plug 100 is inserted in the opening 68. FIG. 7 is a cross-sectional view of the first housing 60a, taken along line A-A of FIG. 5. FIG. 8 is a cross-sectional view of elements disposed in the first housing 60a and the opening 68, taken along line B-B of FIG. 6.

The number and size of electrical wires 71 passed through the opening 68 may vary depending on the specifications of an electrical apparatus. Therefore, the opening 68 is sized to have a large space, which may be too much in some cases.

When electrical wires 71 are passed through the opening 68, a void that is not occupied by any electrical wire 71 may be left in the opening 68. In the present preferred embodiment, such a void is reduced or prevented by the plug 100 being inserted together with the electrical wires 71 in the opening 68.

The plug 100 and the electrical wires 71, and a protection cover 72 covering the plug 100 and the electrical wires 71, may be bound by a binding member (binder) 73. The binding member 73 is, for example, but not limited to, a cable tie. The electrical wires 71 and the plug 100 may be disposed together with the protection cover 72 in the opening 68. Since the protection cover 72 is disposed in the opening 68, the void in the opening 68 is prevented. For example, the plug 100, the electrical wires 71, and the protection cover 72 are bound by the binding member 73, and the plug 100 and the protection cover 72, which are thus bound, are inserted in the opening 68, such that the plug 100 and the protection cover 72 are disposed in the opening 68.

Figure 9:
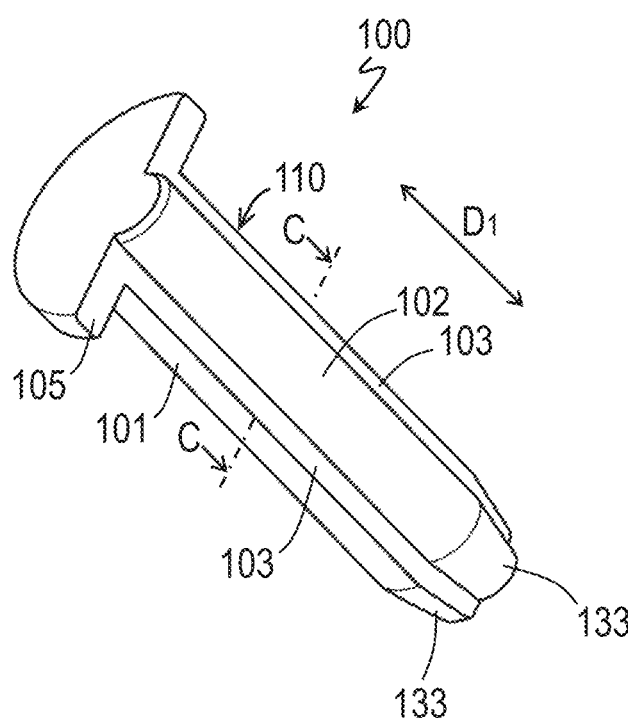
FIG. 9 is a perspective view illustrating a plug 100 according to a preferred embodiment of the present invention.
Figure 10:
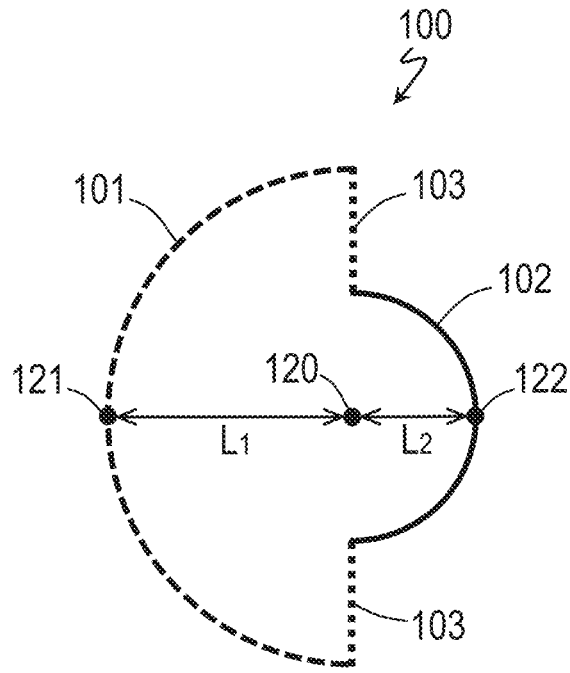
FIG. 10 is a diagram for describing a cross-sectional shape of a plug 100 according to a preferred embodiment of the present invention.

FIG. 9 is a perspective view of the plug 100 of the present preferred embodiment. FIG. 10 is a cross-sectional view of the plug 100 taken along line C-C of FIG. 9. The plug 100 may be made of, for example, a synthetic resin such as plastic or a metal material such as aluminum. The plug 100 has a solid body 110 extending in a first direction $D_1$. FIG. 10 illustrates a cross-section of the body 110 perpendicular to the first direction $D_1$.

The body 110 includes a center axis 120 parallel to the first direction $D_1$, a first outer peripheral surface 101, a second outer peripheral surface 102, and a third outer peripheral surface 103. In FIG. 10, the first outer peripheral surface 101 is indicated by a dashed line, the second outer peripheral surface 102 is indicated by a solid line, and the third outer peripheral surface 103 is indicated by a dotted line.

The first outer peripheral surface 101 has, in the cross-section thereof perpendicular to the first direction $D_1$, a first arc shape extending around the center axis 120. In this cross-section, the second outer peripheral surface 102 has a second arc shape extending around the center axis 120. The third outer peripheral surface 103 links the first outer peripheral surface 101 and the second outer peripheral surface 102 together. In this example, the first outer peripheral surface 101 and the second outer peripheral surface 102 have a circular arc shape. The circular arc shape is merely illustrative. The shapes of the first outer peripheral surface 101 and the second outer peripheral surface 102 are not limited to this.

A distance $L_2$ between the center axis 120 and the second outer peripheral surface 102 is shorter than a distance $L_1$ between the center axis 120 and the first outer peripheral surface 101. In the above-described cross-section, a center point 122 along the second arc shape of the second outer peripheral surface 102 is located on the opposite side of the center axis 120 from a center point 121 along the first arc shape of the first outer peripheral surface 101.

Figure 11:
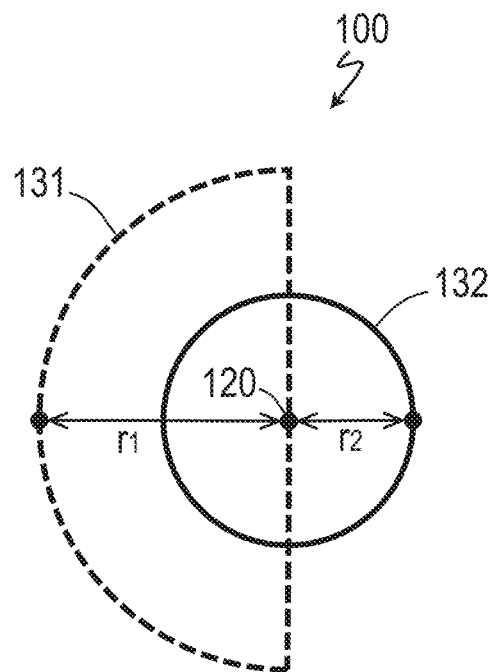
FIG. 11 is a diagram for describing a cross-sectional shape of a plug 100 according to a preferred embodiment of the present invention.

It may be considered that the cross-sectional shape of the body 110 of the plug 100 is obtained by a sector and a circle overlapping each other. FIG. 11 is a diagram illustrating a cross-section of the body 110 perpendicular to the first direction $D_1$. The cross-section of the body 110 is shaped by a sector 131 whose central angle has a vertex at the center axis 120 and a circle 132 extending around the center axis 120 overlapping each other. The radius $r_1$ of the sector 131 has the first length $L_1$ (FIG. 10). The radius $r_2$ of the circle 132 has the second length $L_2$, which is shorter than the first length $L_1$. In the example of FIG. 11, the central angle of the sector 131 is, but not limited to, about 180 degrees. As described below with reference to FIGS. 16 and 17, the central angle of the sector 131 is either smaller than or greater than 180 degrees.

Figure 12:
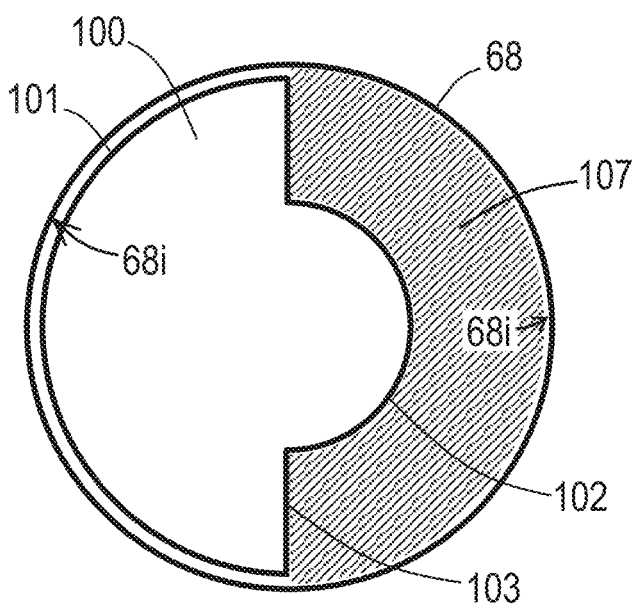
FIG. 12 is a diagram illustrating a cross-section of a plug 100 located in an opening 68 according to a preferred embodiment of the present invention.
Figure 12:
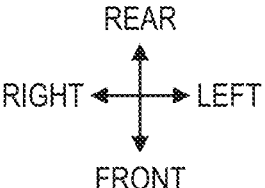

FIG. 12 is a diagram illustrating a cross-section of the plug 100 taken when the plug 100 is disposed in the opening 68.

In a preferred embodiment of the present invention, the opening 68 extends in the top-bottom direction of the housing 60. A cross-section of the opening 68 perpendicular to the top-bottom direction has a circular shape. For the sake of simplicity, it is here assumed that the top-bottom direction of the housing 60 is parallel to the first direction $D_1$, in which the plug 100 extends.

The first outer peripheral surface 101 of the plug 100 matches or corresponds to an inner wall surface 68*i* of the opening 68 when the plug 100 is inserted in the opening 68. In other words, the first outer peripheral surface 101 and the inner wall surface 68*i* have substantially the same shape. The matching between the first outer peripheral surface 101 and the inner wall surface 68*i* is not limited to the feature that the first outer peripheral surface 101 fits the inner wall surface 68*i*. For example, the protection cover 72 may be provided between the first outer peripheral surface 101 and the inner wall surface 68*i*.

The second outer peripheral surface 102 is opposite and spaced apart from the inner wall surface 68*i* of the opening 68. A distance between the second outer peripheral surface 102 and the inner wall surface 68*i* is greater than a distance between the first outer peripheral surface 101 and the inner wall surface 68*i*.

As the second outer peripheral surface 102 is opposite and spaced apart from the inner wall surface 68*i* of the opening 68, a space 107 (a region indicated by hatching in FIG. 12) is formed between the plug 100 and the opening 68. In the example of FIG. 12, the space 107 has a cross-section having an annular sector shape. The annular sector corresponds to a portion of an annulus (a region between two concentric circles) interposed between two straight lines extending radially. The space 107 is able to accommodate electrical wires 71.

Figure 13:
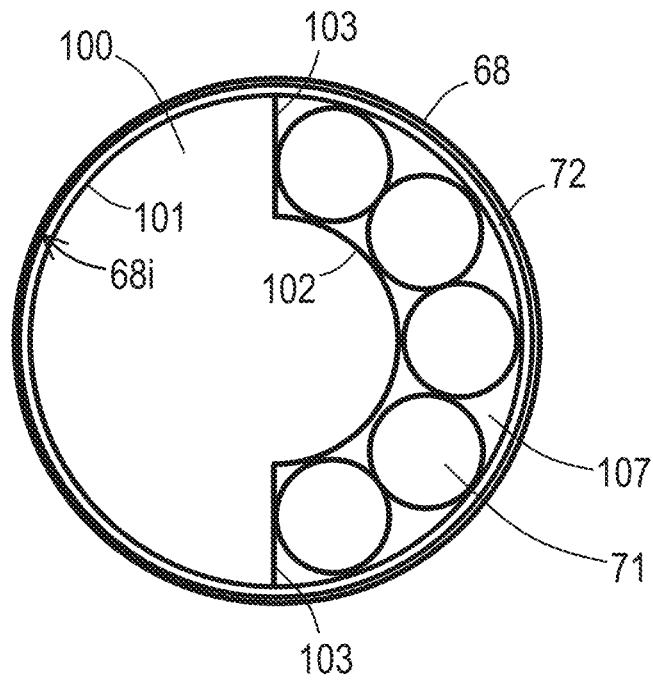
FIG. 13 is a diagram illustrating a cross-section of a plug 100 and electrical wires 71 located in an opening 68 according to a preferred embodiment of the present invention.
Figure 13:
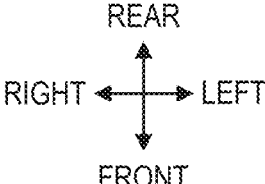

FIG. 13 is a diagram illustrating a cross-section of the plug 100 and electrical wires 71 taken when the plug 100 and the electrical wires 71 are disposed in the opening 68. In the example of FIG. 13, the electrical wires 71 and the plug 100 are surrounded by the protection cover 72. Since the space 107 accommodates the electrical wires 71, the plug 100 is disposed together with the electrical wires 71 in the opening 68.

Figure 14:
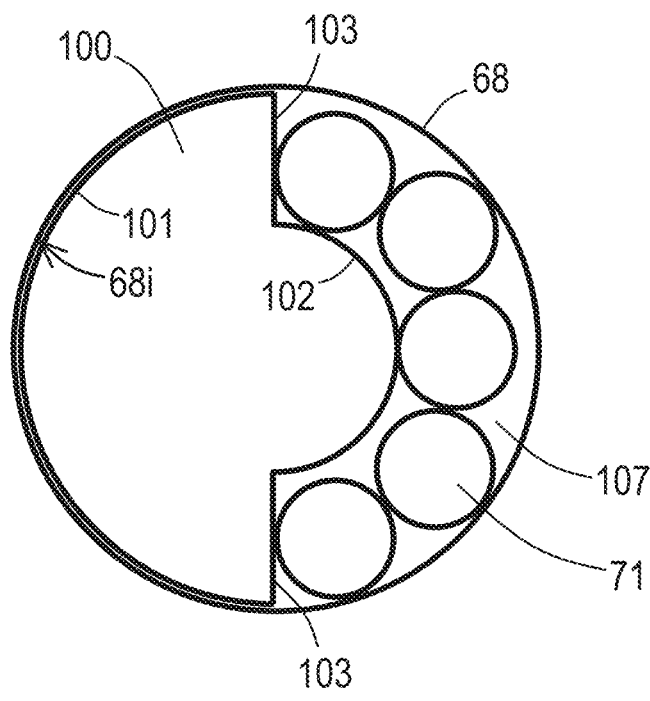
FIG. 14 is a diagram illustrating another example of a cross-section of a plug 100 and electrical wires 71 located in an opening 68 according to a preferred embodiment of the present invention.
Figure 14:
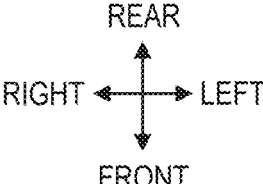

It should be noted that the protection cover 72 to cover the electrical wires 71 and the plug 100 may not be provided. FIG. 14 is a diagram illustrating a cross-section of the plug 100 and the electrical wires 71 taken when the plug 100 and the electrical wires 71 are located in the opening 68 without the protection cover 72. The first outer peripheral surface 101 may have a shape more similar to or better matching the inner wall surface 68*i* in the case in which the protection cover 72 is not provided than in the case in which the protection cover 72 is provided.

As described above, in the opening 68, a void is present that is not occupied by any electrical wire 71. In the present preferred embodiment, the void is reduced or prevented by the plug 100 being inserted together with electrical wires 71 in the opening 68. The remaining void is filled with a liquid waterproofing material, which is then cured, such that waterproofness is attained.

Figure 15:
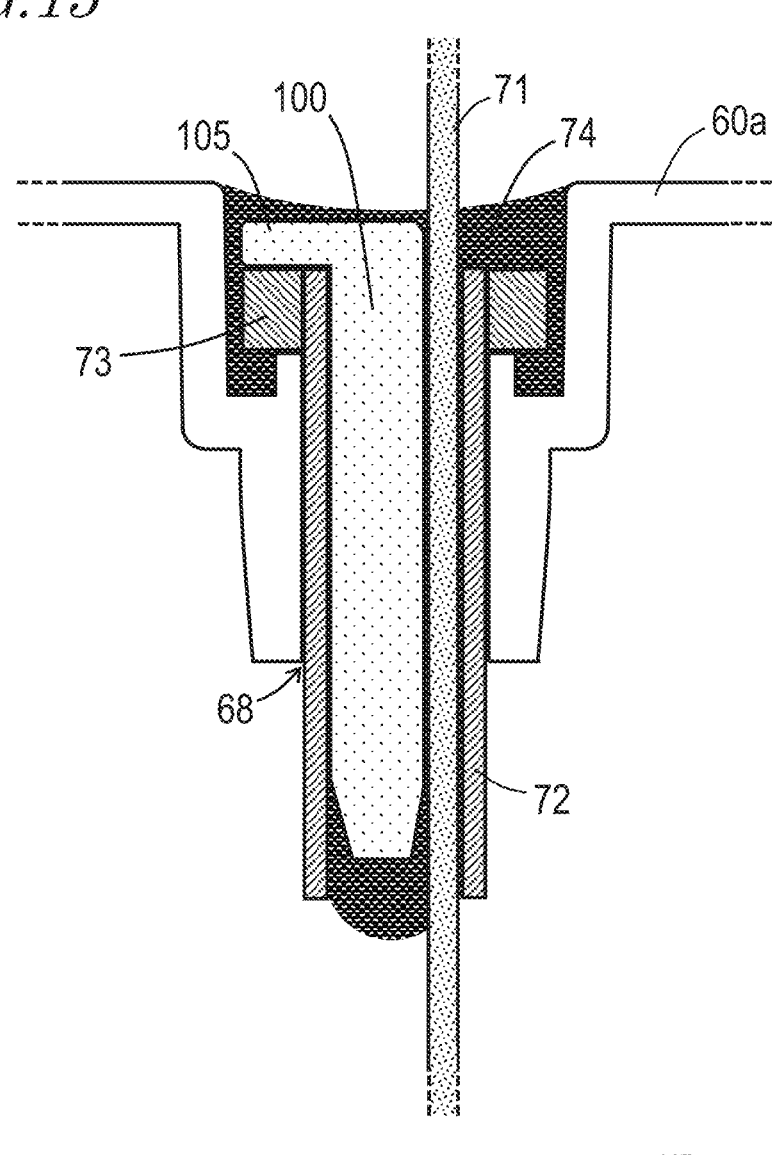
FIG. 15 is a cross-sectional view illustrating a first housing 60a according to a preferred embodiment of the present invention and elements in an opening 68.
Figure 15:
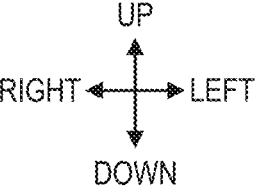

FIG. 15 is a cross-sectional view of the first housing 60*a* and elements disposed in the opening 68, taken along line B-B of FIG. 6. In the example of FIG. 15, a void in the opening 68, and a recess of the first housing 60*a* around the opening 68, are filled with a waterproofing material 74. In the case in which a void is present between the inner wall surface 68*i* of the opening 68 and the protection cover 72, that void is also filled with the waterproofing material 74. A portion of the waterproofing material 74 may flow out of the housing 60 along the electrical wires 71.

The waterproofing material 74 is, for example, an epoxy resin. By pouring a hot liquid epoxy resin 74 into the opening 68 from above, the void in the opening 68 is filled with the epoxy resin 74. The filling epoxy resin 74 may be cured by cooling.

The waterproofing material 74 is not limited to an epoxy resin, and may be other synthetic resins. For example, the waterproofing material 74 may be a UV curable resin. The opening 68 may be filled with the waterproofing material 74 such that at least any void vertically penetrating through the opening 68 is filled.

As described above, when the electrical wires 71 are passed through the opening 68, a void that is not occupied by any electrical wire 71 is left in the opening 68. In the present preferred embodiment, the plug 100 is inserted together with electrical wires 71 in the opening 68, such that the void is reduced or prevented. The second outer peripheral surface 102 of the plug 100 is spaced apart from the inner wall surface 68*i* of the opening 68, and therefore, the space 107 between the second outer peripheral surface 102 and the inner wall surface 68*i* of the opening 68 can accommodate the electrical wires 71, such that the plug 100 is disposed together with the electrical wires 71 in the opening 68. Since the void in the opening 68 is prevented, the waterproofing material 74 is reduced or prevented from flowing into portions for which the waterproofing material 74 is not required when the void is filled with the waterproofing material 74. A sufficient amount of the waterproofing material 74 is retained in the void in the opening 68, resulting in an improved waterproofness.

In the case in which a plurality of electrical wires 71 are surrounded by the protection cover 72, a void that is not occupied by any electrical wire 71 is left in the space surrounded by the protection cover 72. Such a void is reduced or prevented using the plug 100, resulting in an improved waterproofness as in the foregoing preferred embodiments.

As the first outer peripheral surface 101 of the plug 100 matches the inner wall surface 68*i* of the opening 68, the position of the plug 100 is stabilized. The stabilization of the position of the plug 100 stabilizes the positions of the electrical wires 71 inserted between the second outer peripheral surface 102 and the inner wall surface 68*i*, which in turn reduces or prevents movement of the electrical wires 71. By reducing or preventing movement of the electrical wires 71, a void is reduced or prevented from being produced between the electrical wires 71 and the waterproofing material 74, resulting in an improved waterproofness.

The first outer peripheral surface 101 of the plug 100 has an arc cross-section perpendicular to the first direction $D_1$. As a result, when the plug 100 and the electrical wires 71 are bound by the binding member 73 such as a cable tie, the binding member 73 easily extends along the first outer peripheral surface 101, resulting in a stable binding.

The second outer peripheral surface 102 of the plug 100 has a relatively small arc cross-section perpendicular to the first direction $D_1$ compared to the first outer peripheral surface 101. Since a plurality of electrical wires 71 are arranged along the arc shape of the second outer peripheral surface 102, the positions of the electrical wires 71 are stabilized, which in turn reduces or prevents movement of the electrical wires 71. By reducing or preventing movement of the electrical wires 71, a void is reduced or prevented from being produced between the electrical wires 71 and the waterproofing material 74, resulting in an improved water-proofness. In addition, since the plurality of electrical wires 71 are arranged along the second outer peripheral surface 102, and therefore, a positional relationship between the plug 100 and the electrical wires 71 is stabilized, the plug 100 and the plurality of electrical wires 71 are easily bound together. Since the plurality of electrical wires 71 are arranged along the arc shape of the second outer peripheral surface 102, the plug 100 and the plurality of electrical wires 71 are stably inserted in a ring defined by the binding member 73. In addition, as a portion of the plurality of electrical wires 71 are in contact with and supported by the third outer peripheral surface 103 of the plug 100, the positions of the electrical wires 71 is further stabilized.

As illustrated in FIG. 9, a flange 105 is provided at an end portion in the first direction $D_1$ of the first outer peripheral surface 101 of the plug 100. The other end portion in the first direction $D_1$ of the first outer peripheral surface 101 has a tapered shape 133. An end portion of the second outer peripheral surface 102 has a similar tapered shape 133. Since the plug 100 has the tapered shape 133, the plug 100 is easily inserted into the opening 68 with the plug 100 and the electrical wires 71 bound together.

The flange 105 of the plug 100 has a shape extending in a direction intersecting with the first direction $D_1$. Since the flange 105 of the plug 100 is hooked onto a peripheral portion of the entrance of the opening 68, the plug 100 is prevented from falling out of the opening 68. In the illustrated example, the flange 105 has, but is not limited to, an annular sector shape. For example, the flange 105 may have a tongue-like shape. The flange 105 may have any suitable shape that prevents the plug 100 from falling out of the opening 68.

As illustrated in FIGS. 8 and 15, the binding member 73 that binds the plug 100 and the plurality of electrical wires 71 is located between a peripheral portion of the opening 68 and the flange 105 of the plug 100. Since the binding member 73 is interposed between the peripheral portion of the opening 68 and the flange 105, the binding member 73 is prevented from being displaced.

As illustrated in FIGS. 8 and 15, the plug 100 may penetrate through the opening 68, and a portion of the plug 100 may extend out of the housing 60. Since a portion of the plug 100 is located outside the housing 60, the positions of the electrical wires 71 are stabilized in the vicinity of an external surface of the housing 60.

Figure 16:
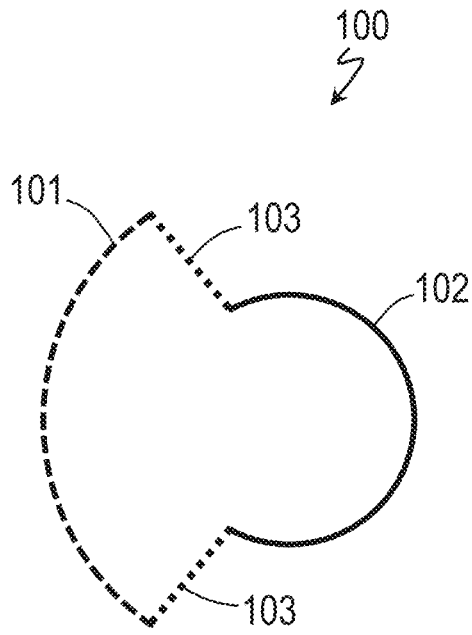
FIG. 16 is a diagram illustrating another example of a cross-sectional shape of a plug 100 according to a preferred embodiment of the present invention.
Figure 17:
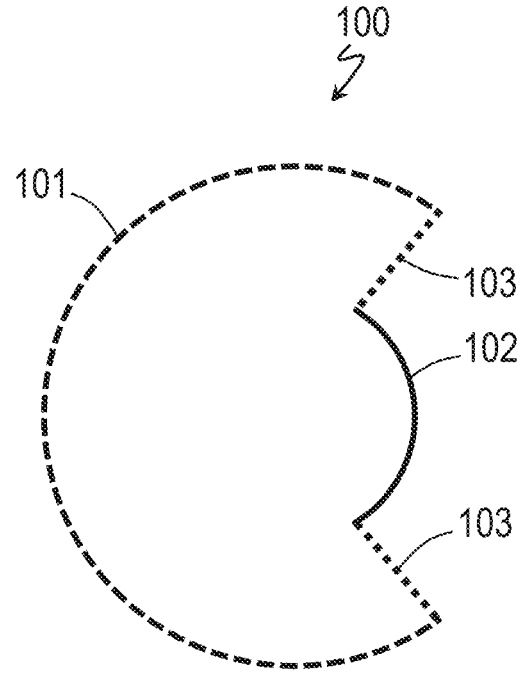
FIG. 17 is a diagram illustrating still another example of a cross-sectional shape of a plug 100 according to a preferred embodiment of the present invention.

The proportions of the areas of the first outer peripheral surface 101 and the second outer peripheral surface 102 to the entire area of the plug 100 may have any suitable values. FIGS. 16 and 17 are diagrams illustrating another example of the cross-sectional shape of the plug 100 perpendicular to the first direction $D_1$. The proportion of the first outer peripheral surface 101 is smaller and the proportion of the second outer peripheral surface 102 is greater in the cross-sectional shape of FIG. 16 than those in the cross-sectional shape of FIG. 10. As a result, a larger number of electrical wires 71 are able to be disposed along the second outer peripheral surface 102.

In the cross-sectional shape of FIG. 17, the proportion of the first outer peripheral surface 101 is greater and the proportion of the second outer peripheral surface 102 is smaller than those in the cross-sectional shape of FIG. 10. As a result, even in the case in which the number of electrical wires 71 is small, a void in the opening 68 is prevented.

Figure 18:
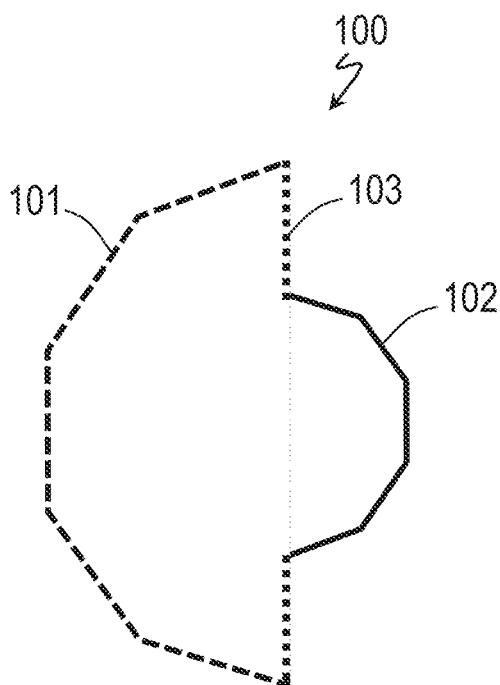
FIG. 18 is a diagram illustrating still another example of a cross-sectional shape of a plug 100 according to a preferred embodiment of the present invention.

FIG. 18 is a diagram illustrating still another example of the cross-sectional shape of the plug 100 perpendicular to the first direction $D_1$. In the cross-sectional shape of FIG. 18, the first outer peripheral surface 101 and the second outer peripheral surface 102 each have a shape defined by a plurality of line segments linked together. For example, the first outer peripheral surface 101 and the second outer peripheral surface 102 each have a shape corresponding to a portion of the outer peripheral portion of a polygon. The first outer peripheral surface 101 and the second outer peripheral surface 102 may each have a shape that is a combination of curves and line segments. Only one of the first outer peripheral surface 101 and the second outer peripheral surface 102 may have a shape including line segments as described above. Such a shape provides an effect similar to that described above.

Figure 19:
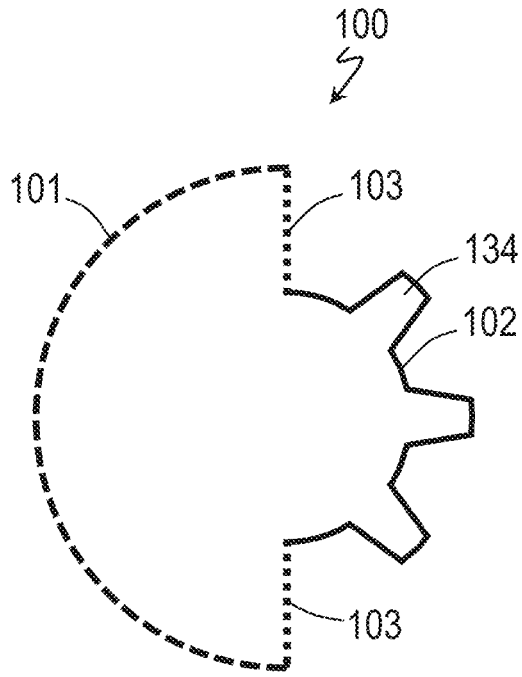
FIG. 19 is a diagram illustrating still another example of a cross-sectional shape of a plug 100 according to a preferred embodiment of the present invention.

FIG. 19 is a diagram illustrating even still another example of a cross-sectional shape of the plug 100 perpendicular to the first direction $D_1$. The plug 100 of FIG. 19 includes a plurality of protrusions 134 protruding from the second outer peripheral surface 102 in a direction intersecting with the first direction $D_1$. By disposing an electrical wire 71 between protrusions 134 or between a protrusion 134 and the third outer peripheral surface 103, the position of the electrical wire 71 is further stabilized.

In the above preferred embodiments, a two-wheel electric power assisted bicycle has been illustrated as the electric power assisted bicycle 1. The present invention is not limited to this. For example, the electric power assisted bicycle 1 may be an electric power assisted bicycle with three or more wheels.

In the above preferred embodiments, the drive wheel to which the user's pedaling force and the assistance power generated by the electric motor are transmitted is the rear wheel. The present invention is not limited to this. The human power and assistance power may be transmitted to the front wheel, or both of the front wheel and the rear wheel, depending on the configuration of the electric power assisted bicycle.

Although in the above preferred embodiments, the electric power assisted vehicle is the electric power assisted bicycle 1, the present invention is not limited to this. For example, the electric power assisted vehicle may be an electric power assistance wheelchair.

As illustrated in FIG. 2, the shape of the power supply switch 61 of the operation board 5 may be different from that of the headlight switch 62 and the select switch 63. This enables the user to easily recognize the position of the power supply switch 61, which is more frequently used, by the sense of touch even when these switches are disposed at positions that are difficult for the user to see.

Figure 20:
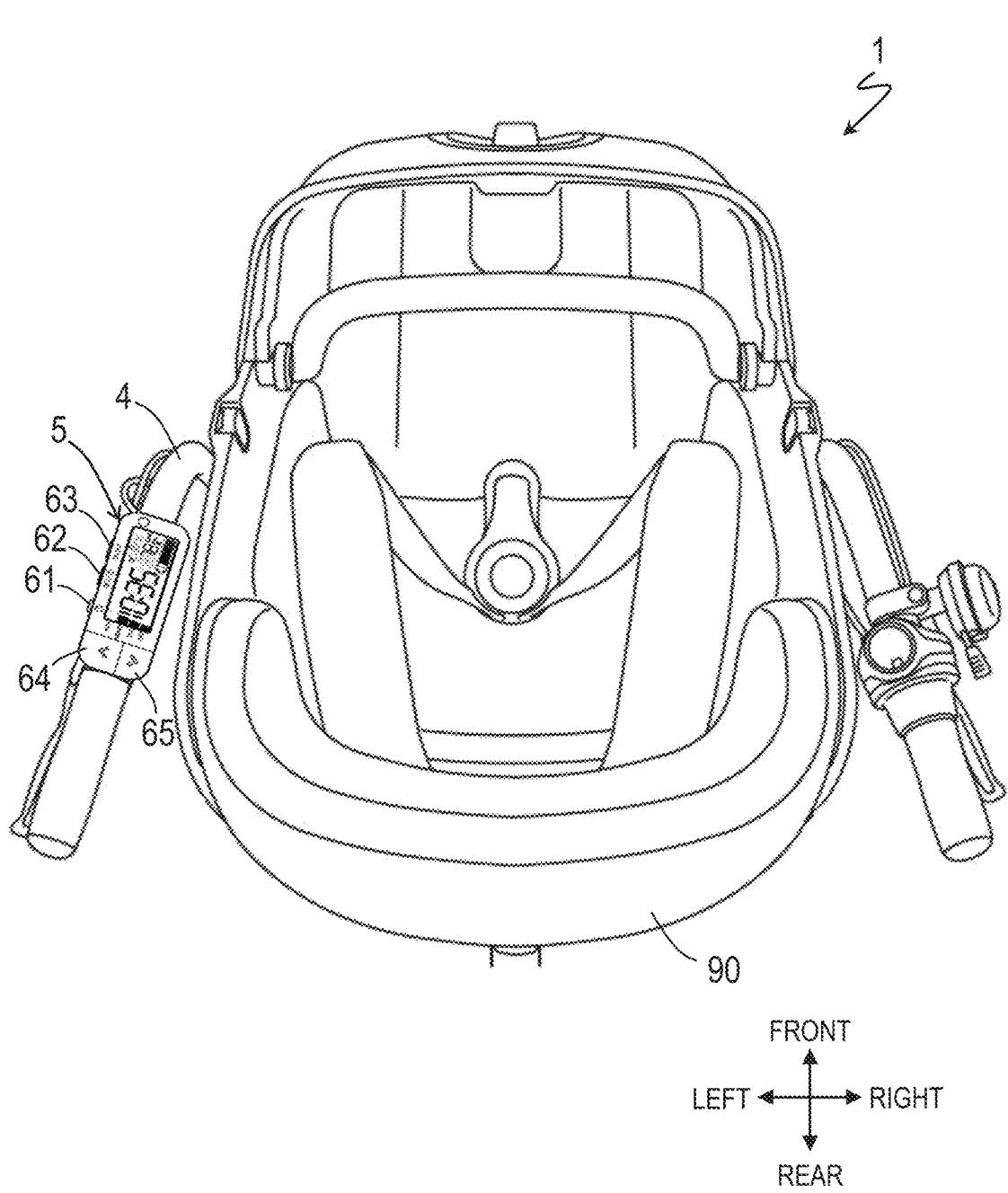
FIG. 20 is a diagram illustrating a front portion of an electric power assisted bicycle 1 at which a child bicycle seat 90 is provided on a handlebar 4, according to a preferred embodiment of the present invention.

For example, the operation board 5 may be provided on the handlebar 4 with the switches 61, 62, and 63 facing outward from the vehicle. FIG. 20 is a diagram illustrating a front portion of the electric power assisted bicycle 1 at which a child bicycle seat 90, on which a child can sit, is provided on the handlebar 4. Because the switches 61, 62, and 63 of the operation board 5 face outward from the vehicle, a space for operating the switches 61, 62, and 63 with a finger is provided even when the child bicycle seat 90 is provided on the handlebar 4. Meanwhile, because the switches 61, 62, and 63 face outward from the vehicle, these switches may be difficult for the user to see. Even in such a case, because the shape of the power supply switch 61 is different from that of the other switches, the user is able to easily recognize the position of the power supply switch 61 by the sense of touch.

The color of the power supply switch 61 may be different from that of the headlight switch 62 and the select switch 63. This enables the user to easily visually recognize the position of the power supply switch 61.

In a preferred embodiment of the present invention, as illustrated in FIG. 2, the size of the assistance power setting switch 64 is greater than that of the assistance power setting switch 65. It may be desirable to quickly increase the assistance power of the electric motor 32, for example, when the vehicle comes to a steep uphill slope during traveling. Even in such a case, because the assistance power setting switch 64 has a greater size, the user is able to easily operate the assistance power setting switch 64.

As illustrated in FIG. 3, the assistance power setting switches 64 and 65 may further extend on a side wall of the housing 60. Since the assistance power setting switches 64 and 65 further extend on a side wall of the housing 60, the assistance power setting switches 64 and 65 are able to be operated by touching a side surface thereof with a finger, resulting in an improved operability.

The surfaces of the plurality of switches of the operation board 5 may have different roughnesses. This enables the user to distinguish the switches from each other with the sense of touch without visual recognition.

In the foregoing, illustrative preferred embodiments of the present invention have been described.

An electrical apparatus 5 according to a preferred embodiment of the present invention includes a housing 60 including an opening 68, an electronic component 50 disposed in the housing 60, a plurality of electrical wires 71 connected to the electronic component 50 and extending out of the housing 60 through the opening 68, a plug 100 extending in a first direction $D_1$ and inserted in the opening 68 with the plurality of electrical wires 71 passing through the opening 68, and a waterproofing material 74 filling the opening 68, wherein the plug 100 has a first outer peripheral surface 101 matching an inner wall surface 68_i_ of the opening 68 in the opening 68, and a second outer peripheral surface 102 opposite and spaced apart from the inner wall surface 68_i_ of the opening 68, and the plurality of electrical wires 71 are accommodated between the second outer peripheral surface 102 and the inner wall surface 68_i_ of the opening 68.

When the electrical wires 71 are passed through the opening 68 of the housing 60 of the electrical apparatus 5, a void that is not occupied by any electrical wire 71 is left in the opening 68. According to a preferred embodiment of the present invention, the plug 100 is inserted together with the electrical wires 71 in the opening 68, and therefore, the void is reduced or prevented. Since the second outer peripheral surface 102 of the plug 100 is spaced apart from the inner wall surface 68_i_ of the opening 68, the electrical wires 71 are accommodated between the second outer peripheral surface 102 and the inner wall surface 68_i_ of the opening 68, and the plug 100 is inserted together with the electrical wires 71 in the opening 68. Since the void in the opening 68 is prevented, a waterproofing material 74 is reduced or prevented from flowing into a portion that does not require the waterproofing material 74 when the void is filled with the waterproofing material 74, resulting in an improved waterproofness.

In a configuration in which a protection cover 72 is provided between the opening 68 and the bundle of electrical wires 71, a void is left in a portion of the space surrounded by the protection cover 72 that is not occupied by any electrical wire 71. The void is reduced or prevented using the plug 100, resulting in an improved waterproofness as in the foregoing preferred embodiments.

Since the first outer peripheral surface 101 of the plug 100 matches the inner wall surface 68_i_ of the opening 68, the position of the plug 100 is stabilized. The stabilization of the position of the plug 100 stabilizes the positions of the electrical wires 71 inserted between the second outer peripheral surface 102 and the inner wall surface 68_i_ of the opening 68, which in turn reduces or prevents movement of the electrical wires 71. By reducing or preventing movement of the electrical wires 71, a void is reduced or prevented from being produced between the electrical wires 71 and the waterproofing material 74, resulting in an improved waterproofness.

In a preferred embodiment of the present invention, the plug 100 may further include two third outer peripheral surfaces 103 linking the first outer peripheral surface 101 and the second outer peripheral surface 102 together.

A portion of the electrical wires 71 inserted between the second outer peripheral surface 102 and the inner wall surface 68_i_ of the opening 68 are in contact with and supported by the third outer peripheral surfaces 103. Therefore, the positions of the electrical wires 71 are further stabilized.

In a preferred embodiment of the present invention, the first outer peripheral surface 101 may have, in a cross-section thereof perpendicular to the first direction $D_1$, a first arc shape extending around a center axis 120 parallel to the first direction $D_1$.

When the plug 100 and the electrical wires 71 are bound by a binding member 73 such as a cable tie, the binding member 73 easily extends along the first outer peripheral surface 101, resulting in a stable binding.

In a preferred embodiment of the present invention, in the cross-section, the second outer peripheral surface 102 may have a second arc shape extending around the center axis 120. A distance $L_2$ between the center axis 120 and the second outer peripheral surface 102 may be shorter than a distance $L_1$ between the center axis 120 and the first outer peripheral surface 101. A center point 122 along the second arc shape of the second outer peripheral surface 102 may be located on the opposite side of the center axis 120 from a center point 121 along the first arc shape of the first outer peripheral surface 101.

Since a plurality of electrical wires 71 are arranged along the second outer peripheral surface 102, which has a relatively small arc shape compared to the first outer peripheral surface 101, the positions of the electrical wires 71 are stabilized, which in turn reduces or prevents movement of the electrical wires 71. By reducing or preventing movement of the electrical wires 71, a void is reduced or prevented from being produced between the electrical wires 71 and the waterproofing material 74, resulting in an improved waterproofness. In addition, since the plurality of electrical wires 71 are arranged along the second outer peripheral surface 102, and therefore, a positional relationship between the plug 100 and the electrical wires 71 is stabilized, the plug 100 and the plurality of electrical wires 71 are easily bound together.

In a preferred embodiment of the present invention, in the cross-section, the first outer peripheral surface 101 may have a circular arc shape.

When the plug 100 and the electrical wires 71 are bound by a binding member 73 such as a cable tie, the binding member 73 easily extend along the first outer peripheral surface 101, resulting in a stable binding.

In a preferred embodiment of the present invention, in the cross-section, the second outer peripheral surface 102 may have a circular arc shape.

The plurality of electrical wires 71 arranged along the second outer peripheral surface 102, and the plug 100, may be bound by a binding member 73 that may be curved along the first outer peripheral surface 101. Since the plurality of electrical wires 71 are arranged along the second outer peripheral surface 102, which has a relatively small circular arc shape compared to the first outer peripheral surface 101, the plug 100 and the plurality of electrical wires 71 are stably inserted in a ring defined by the binding member 73.

In a preferred embodiment of the present invention, the plug 100 is shaped such that in the cross-section, a sector 131 whose central angle has a vertex at the center axis 120 and whose radius $r_1$ has a first length $L_1$, and a circle 132 whose center is located at the center axis 120 and whose radius $r_2$ has a second length $L_2$ which is shorter than first length $L_1$, overlap each other.

When the plug 100 and the electrical wires 71 are bound by a binding member 73 such as a cable tie, the binding member 73 easily extends along the first outer peripheral surface 101, resulting in a stable binding. Since the plurality of electrical wires 71 are arranged along the outer periphery of the relatively small circle compared to the sector, the plug 100 and the plurality of electrical wires 71 are stably inserted in a ring defined by the binding member 73.

In a preferred embodiment of the present invention, in the cross-section, a space 107 having an annular sector shape may be located between the plug 100 and the opening 68, and the electrical wires 71 may be accommodated in the annular sector space 107.

As the electrical wires 71 are accommodated in the annular sector space 107 between the plug 100 and the opening 68, the plug 100 is disposed together with the electrical wires 71 in the opening 68.

In a preferred embodiment of the present invention, the plug 100 may further include a flange 105 that extends from a first end portion in the first direction $D_1$ of the first outer peripheral surface 101 in a direction intersecting with the first direction $D_1$.

As the flange 105 of the plug 100 is hooked onto the entrance of the opening 68, the plug 100 is prevented from falling out of the opening 68.

In a preferred embodiment of the present invention, the electrical apparatus 5 may further include a binding member 73 that binds the plurality of electrical wires 71 and the plug 100. The binding member 73 may be located between the opening 68 and the flange 105.

As a result, the binding member 73 is prevented from being displaced.

In a preferred embodiment of the present invention, a second end portion of the first outer peripheral surface 101 on the opposite side from the first end portion in the first direction $D_1$ may have a tapered shape 133.

As a result, the plug 100 is easily inserted in the opening 68 with the plug 100 and the electrical wires 71 bound together.

In a preferred embodiment of the present invention, the electrical apparatus 5 may further include a protection cover 72 provided between the opening 68 and the combination of the plurality of electrical wires 71 and the plug 100, and surrounding the plurality of electrical wires 71 and the plug 100.

As the plug 100 is located in the space surrounded by the protection cover 72, a void is reduced or prevented in the space, and therefore, the waterproofing material 74 to fill the void is reduced or prevented from flowing into a portion that does not require the waterproofing material 74.

In a preferred embodiment of the present invention, the plug 100 may penetrate through the opening 68, and a portion of the plug 100 may extend out of the housing 60.

As a result, the positions of the electrical wires 71 are stabilized in the vicinity of an external surface of the housing 60.

In a preferred embodiment of the present invention, the electrical apparatus 5 may be an operation board 5 provided on a handlebar 4 of the electric power assisted bicycle 1, and operable to receive an operation performed by a user of the electric power assisted bicycle 1.

As a result, the operation board 5 of the electric power assisted bicycle 1 has high waterproofness.

A plug 100 according to a preferred embodiment of the present invention, which is inserted together with a plurality of electrical wires 71 in an opening 68 of a housing 60 of an electrical apparatus 5, has a solid body 110 extending in a first direction $D_1$. The body 110 has a first outer peripheral surface 101 having, in a cross-section thereof perpendicular to the first direction $D_1$, a first arc shape extending around a center axis 120 parallel to the first direction $D_1$, a second outer peripheral surface 102 having, in a cross-section thereof perpendicular to the first direction $D_1$, a second arc shape extending around the center axis 120, and a third outer peripheral surface 103 linking the first outer peripheral surface 101 and the second outer peripheral surface 102 together. A distance $L_2$ between the center axis 120 and the second outer peripheral surface 102 is shorter than a distance $L_1$ between the center axis 120 and the first outer peripheral surface 101. In the cross-section, a center point 122 along the second arc shape of the second outer peripheral surface 102 is located on the opposite side of the center axis 120 from a center point 121 along the first arc shape of the first outer peripheral surface 101.

When the electrical wires 71 are passed through the opening 68 of the housing 60 of the electrical apparatus 5, a void that is not occupied by any electrical wire 71 is left in the opening 68. The void is reduced or prevented by the plug 100 being inserted together with the electrical wires 71 in the opening 68. The prevention of the void reduces or prevents a waterproofing material 74 from flowing into a portion that does not require the waterproofing material 74 when the void is filled with the waterproofing material 74, resulting in an improved waterproofness.

In a configuration in which a protection cover 72 is provided between the opening 68 and the bundle of electrical wires 71, a void is left in a portion of the space surrounded by the protection cover 72 that is not occupied by any electrical wire 71. The void is reduced or prevented using the plug 100, resulting in an improved waterproofness as in the foregoing preferred embodiments.

A plurality of electrical wires 71 are arranged along the second outer peripheral surface 102, which has a relatively small arc shape compared to the first outer peripheral surface 101, and therefore, the positions of the electrical wires 71 are stabilized, which in turn reduces or prevents movement of the electrical wires 71. By reducing or preventing movement of the electrical wires 71, a void is reduced or prevented from being produced between the electrical wires 71 and the waterproofing material 74, resulting in an improved waterproofness. In addition, since the plurality of electrical wires 71 are arranged along the second outer peripheral surface 102, and therefore, a positional relationship between the plug 100 and the electrical wires 71 is stabilized, the plug 100 and the electrical wires 71 are easily bound together.

A portion of the plurality of electrical wires 71 arranged along the second outer peripheral surface 102 are in contact with and supported by the third outer peripheral surfaces 103, and therefore, the positions of the electrical wires 71 are further stabilized.

Preferred embodiments of the present invention are particularly useful in the field of electrical apparatuses that are required to be waterproof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrical apparatus comprising:
   a housing including an opening; an electronic component in the housing; a plurality of electrical wires connected to the electronic component and extending out of the housing through the opening; a plug extending in a first direction and inserted in the opening with the plurality of electrical wires passing through the opening; and a waterproofing material in the opening; wherein the plug includes a first outer peripheral surface matching an inner wall surface of the opening, and a second outer peripheral surface that is convex and opposite and spaced apart from the inner wall surface of the opening so as to define a gap between the second outer peripheral surface and the inner wall surface of the opening; and the plurality of electrical wires are between the second outer peripheral surface and the inner wall surface of the opening.

2. The electrical apparatus according to claim 1, wherein the plug further includes two third outer peripheral surfaces linking the first outer peripheral surface and the second outer peripheral surface together.

3. The electrical apparatus according to claim 1, wherein the plug has a center axis extending parallel or substantially parallel to the first direction; and
   the first outer peripheral surface has, in a cross-section thereof perpendicular to the first direction, a first arc shape extending around the center axis.

4. The electrical apparatus according to claim 3, wherein in the cross-section, the second outer peripheral surface has a second arc shape extending around the center axis;
   a distance between the center axis and the second outer peripheral surface is shorter than a distance between the center axis and the first outer peripheral surface; and
   a center point along the second arc shape of the second outer peripheral surface is located on an opposite side of the center axis from a center point along the first arc shape of the first outer peripheral surface.

5. The electrical apparatus according to claim 3, wherein the first outer peripheral surface has a circular arc shape in the cross-section.

6. The electrical apparatus according to claim 5, wherein the second outer peripheral surface has a circular arc shape in the cross-section.

7. The electrical apparatus according to claim 3, wherein the plug is shaped such that in the cross-section, a sector whose central angle has a vertex at the center axis and whose radius has a first length, and a circle whose center is located at the center axis and whose radius has a second length which is shorter than first length, overlap each other.

8. The electrical apparatus according to claim 1, wherein the plug further includes a flange that extends from a first end portion in the first direction of the first outer peripheral surface in a direction intersecting with the first direction.

9. The electrical apparatus according to claim 8, wherein a second end portion of the first outer peripheral surface on an opposite side from the first end portion in the first direction has a tapering shape.

10. The electrical apparatus according to claim 1, further comprising a protection cover between the opening and the combination of the plurality of electrical wires and the plug, and surrounding the plurality of electrical wires and the plug.

11. The electrical apparatus according to claim 1, wherein the plug penetrates through the opening, and a portion of the plug extends out of the housing.

12. An electrical apparatus comprising:
   a housing including an opening;
   an electronic component in the housing;
   a plurality of electrical wires connected to the electronic component and extending out of the housing through the opening;
   a plug extending in a first direction and inserted in the opening with the plurality of electrical wires passing through the opening; and
   a waterproofing material in the opening; wherein
   the plug includes a first outer peripheral surface matching an inner wall surface of the opening, and a second outer peripheral surface opposite and spaced apart from the inner wall surface of the opening;
   the plurality of electrical wires are between the second outer peripheral surface and the inner wall surface of the opening;
   the plug has a center axis extending parallel or substantially parallel to the first direction;
   the first outer peripheral surface has, in a cross-section thereof perpendicular to the first direction, a first arc shape extending around the center axis;
   the plug is shaped such that in the cross-section, a sector whose central angle has a vertex at the center axis and whose radius has a first length, and a circle whose center is located at the center axis and whose radius has a second length which is shorter than first length, overlap each other; and
   in the cross-section, a space having an annular sector shape is provided between the plug and the opening, and the electrical wires are accommodated in the annular sector space.

13. An electrical apparatus comprising:
   a housing including an opening;
   an electronic component in the housing;
   a plurality of electrical wires connected to the electronic component and extending out of the housing through the opening;
   a plug extending in a first direction and inserted in the opening with the plurality of electrical wires passing through the opening;
   a waterproofing material in the opening; and
   a binder to bind the plurality of electrical wires and the plug; wherein
   the plug includes a first outer peripheral surface matching an inner wall surface of the opening, and a second outer peripheral surface opposite and spaced apart from the inner wall surface of the opening;

the plurality of electrical wires are between the second outer peripheral surface and the inner wall surface of the opening;

the plug further includes a flange that extends from a first end portion in the first direction of the first outer peripheral surface in a direction intersecting with the first direction; and the binder is located between the opening and the flange.

14. An electrical apparatus comprising:

a housing including an opening;

an electronic component in the housing;

a plurality of electrical wires connected to the electronic component and extending out of the housing through the opening;

a plug extending in a first direction and inserted in the opening with the plurality of electrical wires passing through the opening; and a waterproofing material in the opening; wherein the plug includes a first outer peripheral surface matching an inner wall surface of the opening, and a second outer peripheral surface opposite and spaced apart from the inner wall surface of the opening;

the plurality of electrical wires are between the second outer peripheral surface and the inner wall surface of the opening; and the electrical apparatus is an operation board provided on a handlebar of the electric power assisted bicycle, and operable to receive an operation performed by a user of the electric power assisted bicycle.

15. A plug to be inserted together with a plurality of electrical wires in an opening of a housing of an electrical apparatus, wherein in a cross-section, a space having an annular sector shape is provided between the plug and the opening, and the electrical wires are accommodated in the annular sector space, the plug comprising: a body extending in a first direction; wherein the body includes: a center axis parallel to the first direction; a first outer peripheral surface having, in a cross-section thereof perpendicular to the first direction, a first arc shape extending around the center axis; a second outer peripheral surface having, in the cross-section thereof perpendicular to the first direction, a second arc shape that is convex and extending around the center axis; and a third outer peripheral surface linking the first outer peripheral surface and the second outer peripheral surface together; a distance between the center axis and the second outer peripheral surface is shorter than a distance between the center axis and the first outer peripheral surface;

and in the cross-section, a center point along the second convex arc shape of the second outer peripheral surface is located on an opposite side of the center axis from a center point along the first arc shape of the first outer peripheral surface.

* * * * *